United States Patent
North et al.

(10) Patent No.: US 6,754,784 B1
(45) Date of Patent: Jun. 22, 2004

(54) METHODS AND CIRCUITS FOR SECURING ENCACHED INFORMATION

(75) Inventors: Gregory Allen North, Austin, TX (US); Matthew Richard Perry, Austin, TX (US); Brian Christopher Kircher, Round Rock, TX (US)

(73) Assignee: Cirrus Logic, Inc., Austin, TX (US)

(*) Notice: Subject to any disclaimer, the term of this patent is extended or adjusted under 35 U.S.C. 154(b) by 622 days.

(21) Appl. No.: 09/608,055

(22) Filed: Jun. 30, 2000

Related U.S. Application Data

(62) Division of application No. 09/495,813, filed on Feb. 1, 2000.

(51) Int. Cl.$^7$ .............................................. G06F 12/00
(52) U.S. Cl. ...................... 711/145; 711/138; 711/163; 713/193
(58) Field of Search ................. 711/133, 145, 711/147, 138, 163; 713/193

(56) References Cited

U.S. PATENT DOCUMENTS

| | | | |
|---|---|---|---|
| 5,790,977 A | 8/1998 | Ezekiel | 702/122 |
| 5,815,686 A * | 9/1998 | Earl et al. | 703/26 |
| 5,878,135 A | 3/1999 | Blatter et al. | 380/10 |
| 5,889,860 A | 3/1999 | Eller et al. | 380/4 |
| 5,910,987 A | 6/1999 | Ginter et al. | 380/24 |
| 5,917,914 A | 6/1999 | Shaw et al. | 380/43 |
| 5,923,761 A | 7/1999 | Lodenius | 380/49 |
| 5,933,498 A | 8/1999 | Schneck et al. | 380/4 |
| 5,940,506 A | 8/1999 | Chang et al. | 380/4 |
| 5,943,422 A | 8/1999 | Van Wie et al. | 380/9 |
| 5,949,876 A | 9/1999 | Ginter et al. | 380/4 |
| 5,974,508 A * | 10/1999 | Maheshwari | 711/133 |
| 5,982,891 A | 11/1999 | Ginter et al. | 380/4 |
| 5,991,399 A | 11/1999 | Graunke et al. | 380/4 |
| 5,991,402 A | 11/1999 | Jia et al. | 380/9 |
| 6,148,378 A * | 11/2000 | Bordaz et al. | 711/147 |
| 6,370,632 B1 * | 4/2002 | Kikuta et al. | 711/205 |
| 6,397,301 B1 * | 5/2002 | Quach et al. | 711/138 |
| 6,523,118 B1 * | 2/2003 | Buer | 713/189 |

* cited by examiner

Primary Examiner—Hiep T. Nguyen
Assistant Examiner—Ngoc Dinh
(74) Attorney, Agent, or Firm—James J. Murphy; Winstead Sechrest & Minick P.C.

(57) ABSTRACT

A system 100 including a central processing unit 101 operates in response to a set of instructions for processing information. A port 134 provides access to selected circuitry forming a part of the system by an external device. A set of non-volatile programmable security elements 136 selectively enable and disable the operation of the interface to provide a private environment for processing the information.

15 Claims, 20 Drawing Sheets

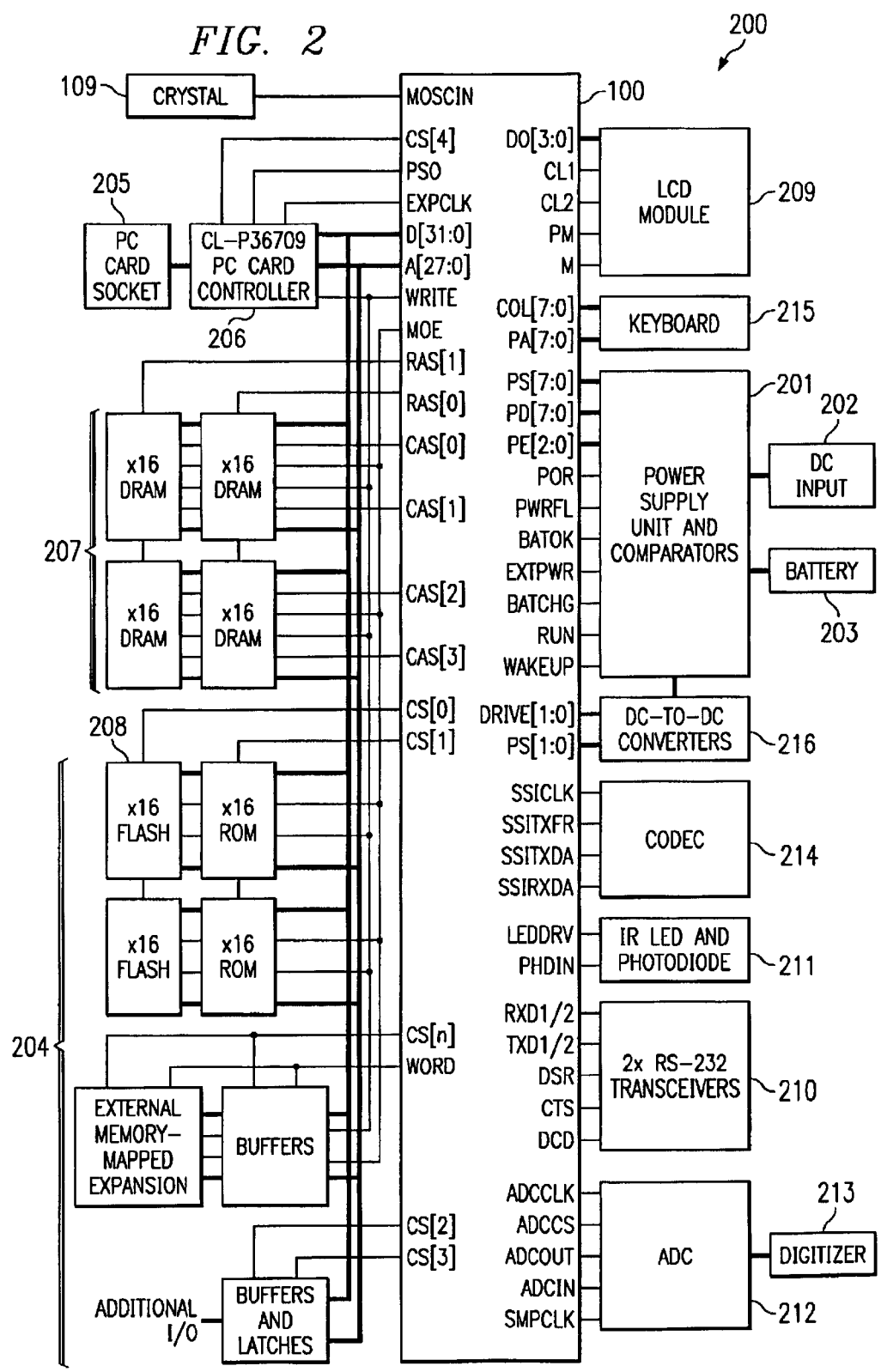

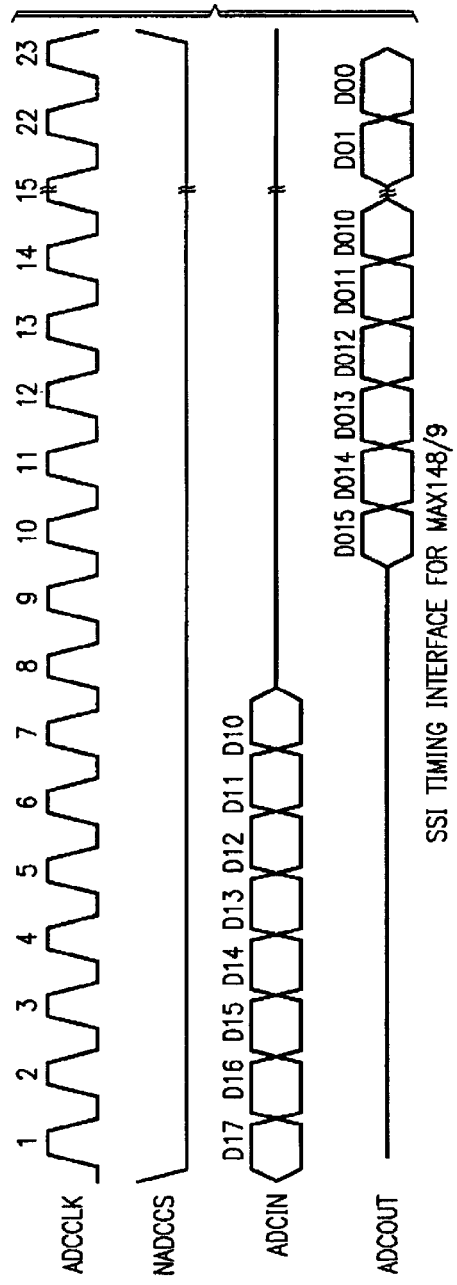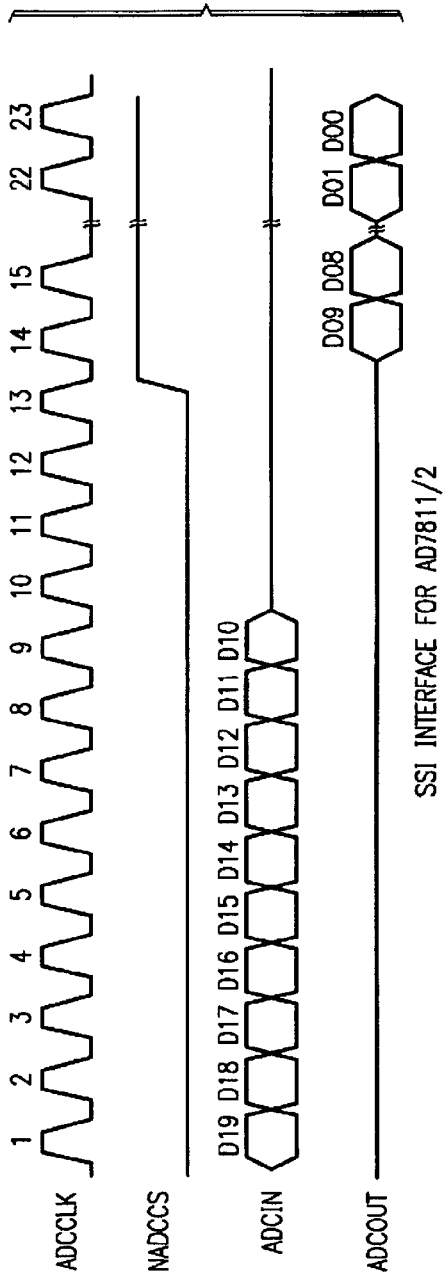

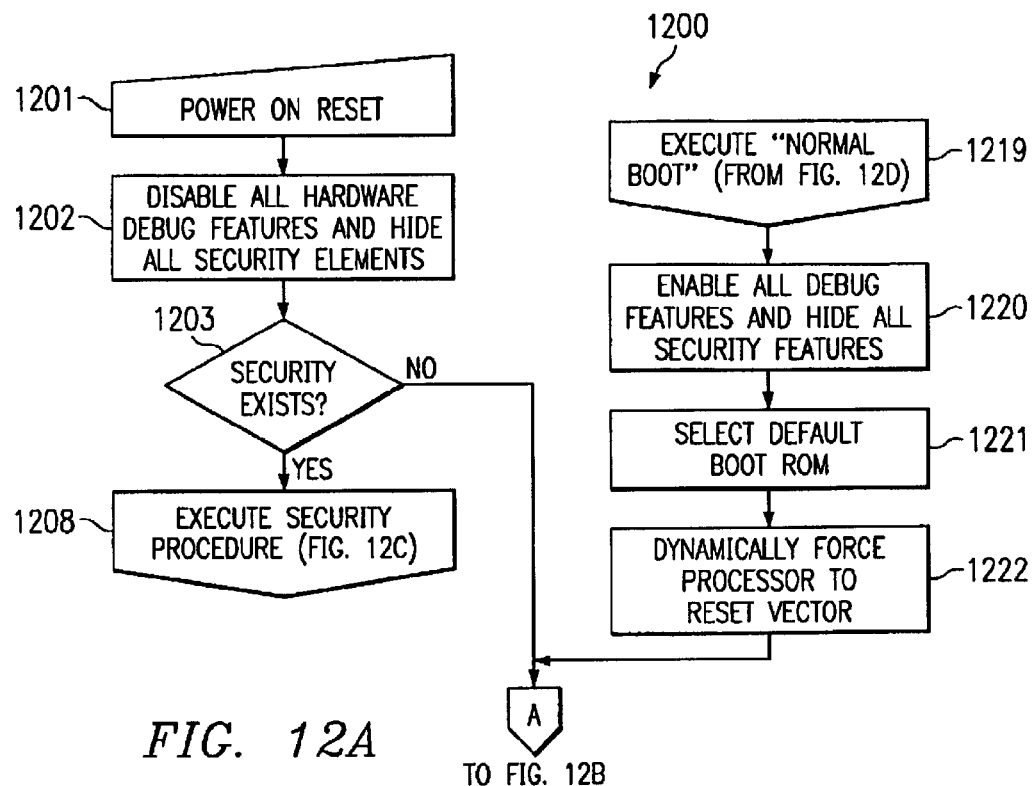
FIG. 12A
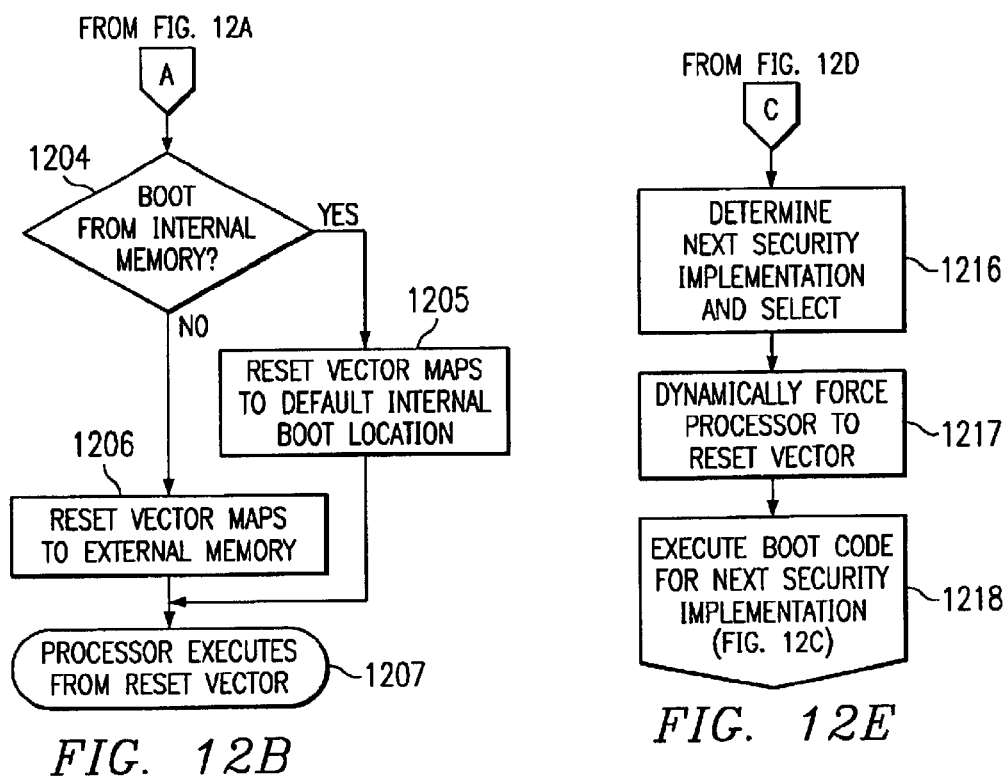
FIG. 12B
FIG. 12E

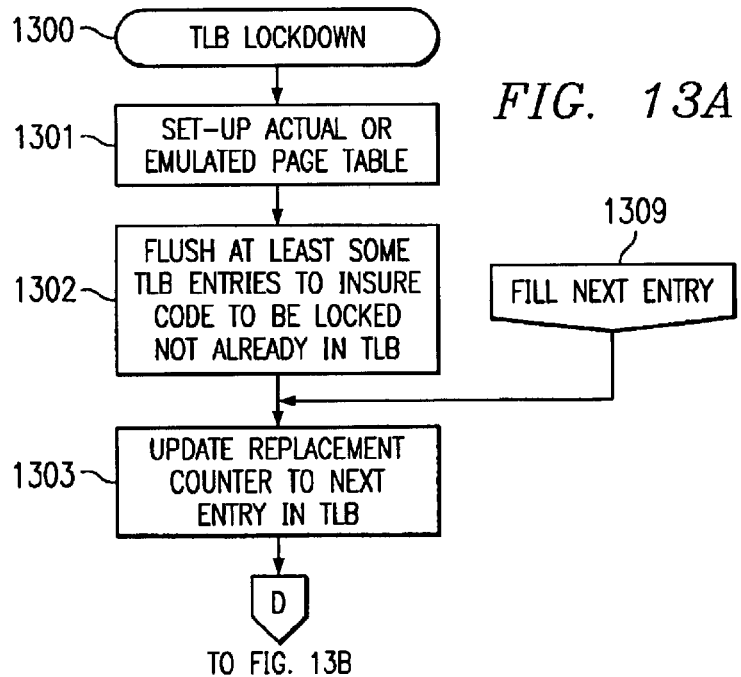
FIG. 13A
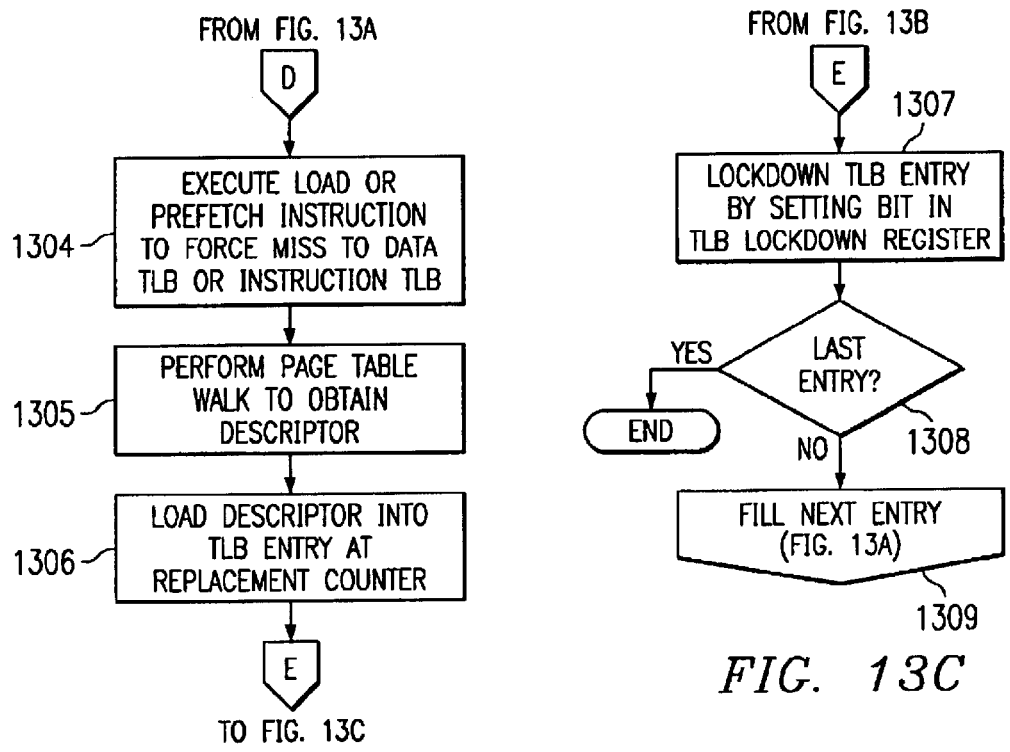
FIG. 13B
FIG. 13C

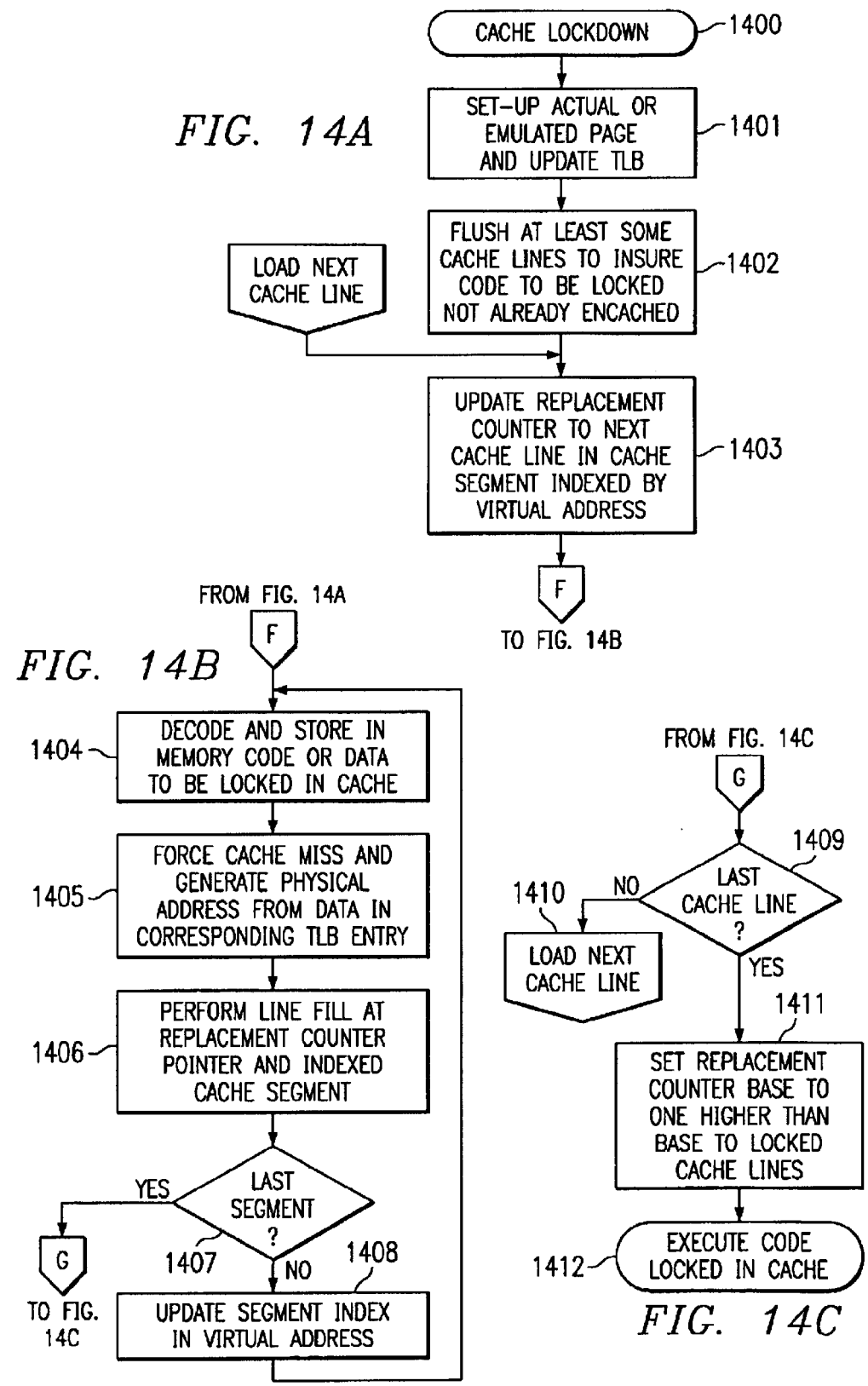

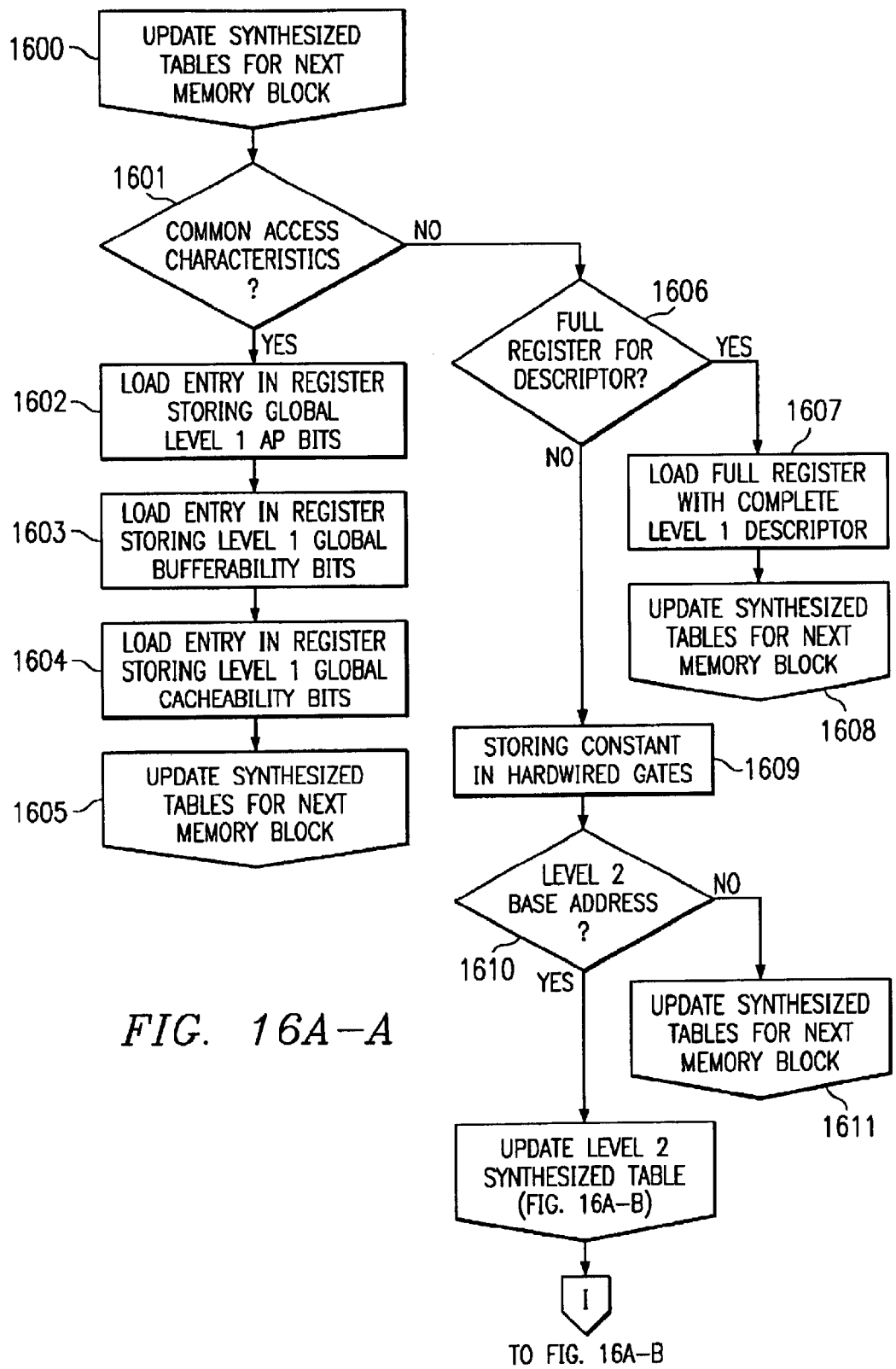
FIG. 16A-A

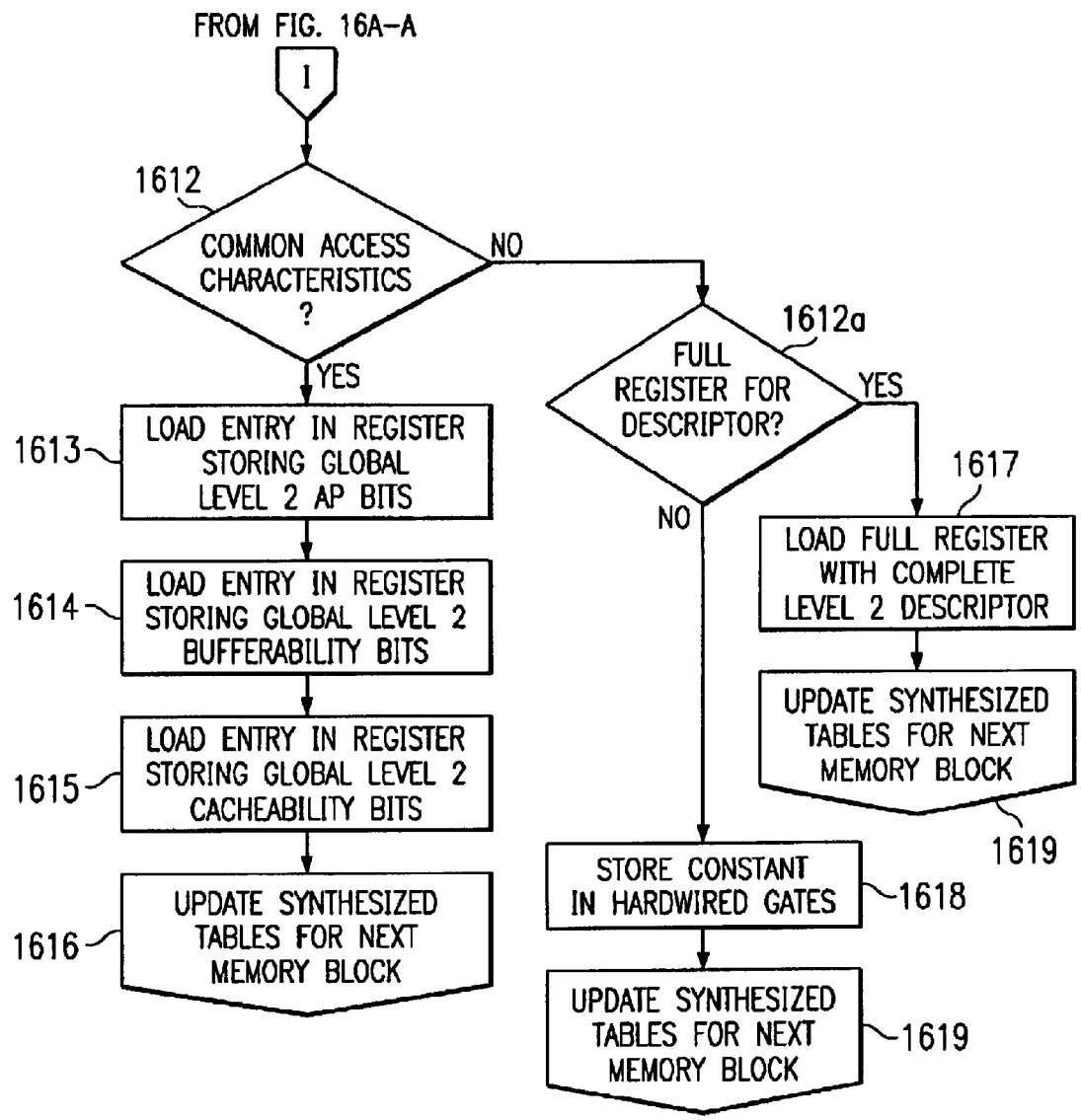
FIG. 16A-B

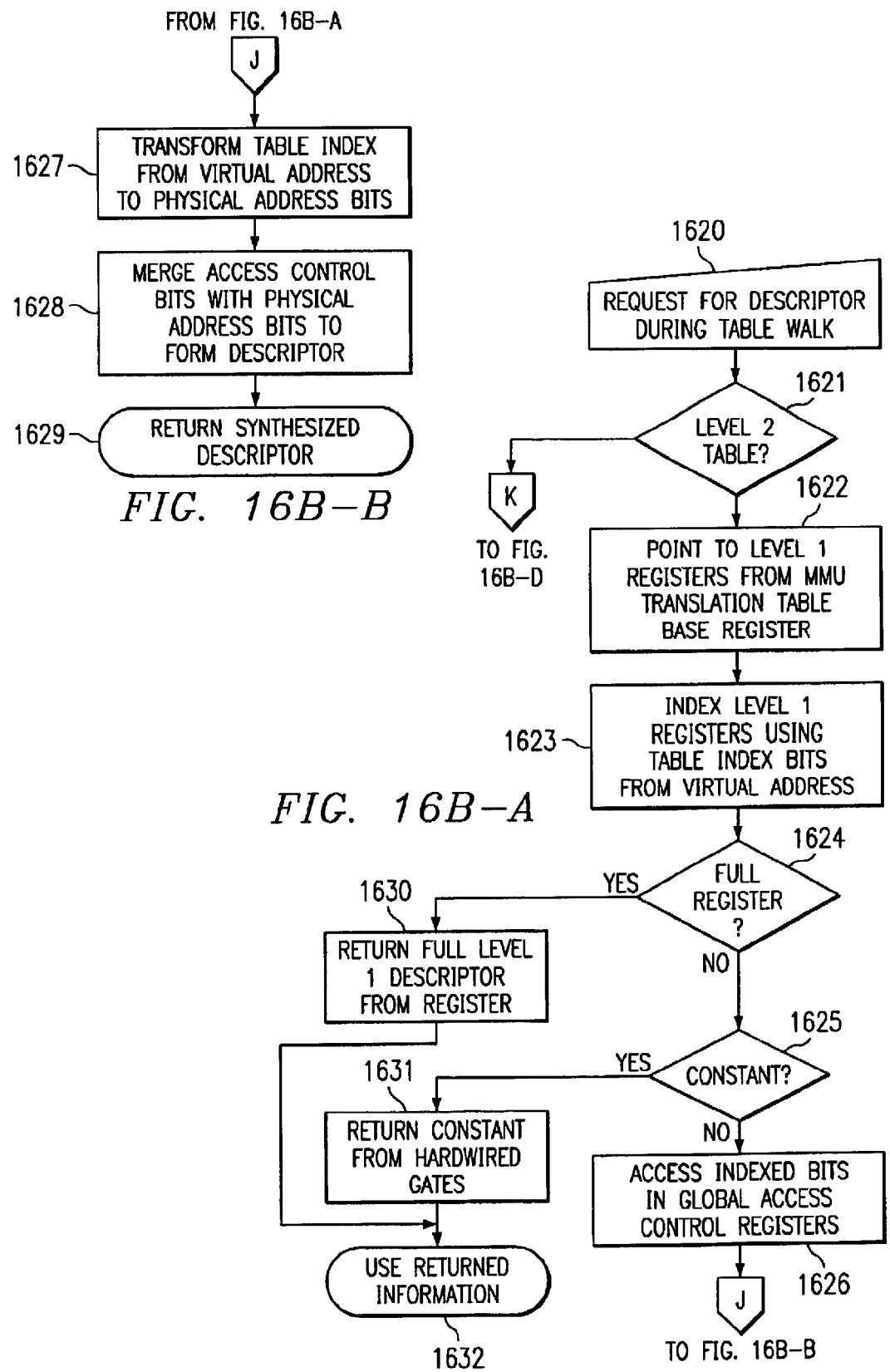

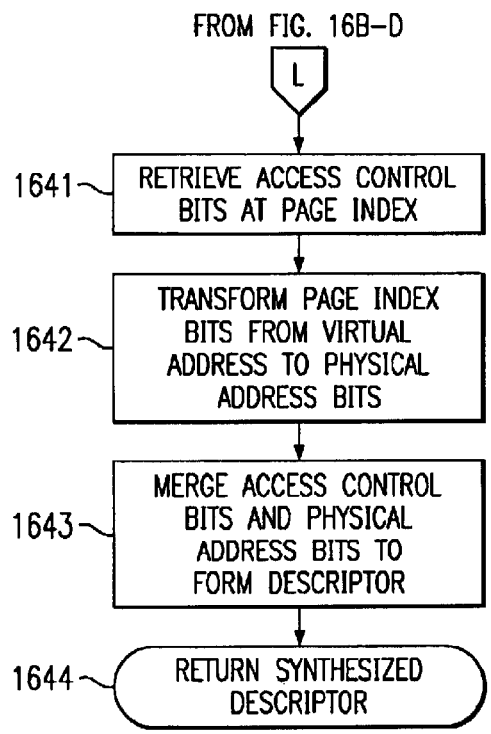
FIG. 16B-C
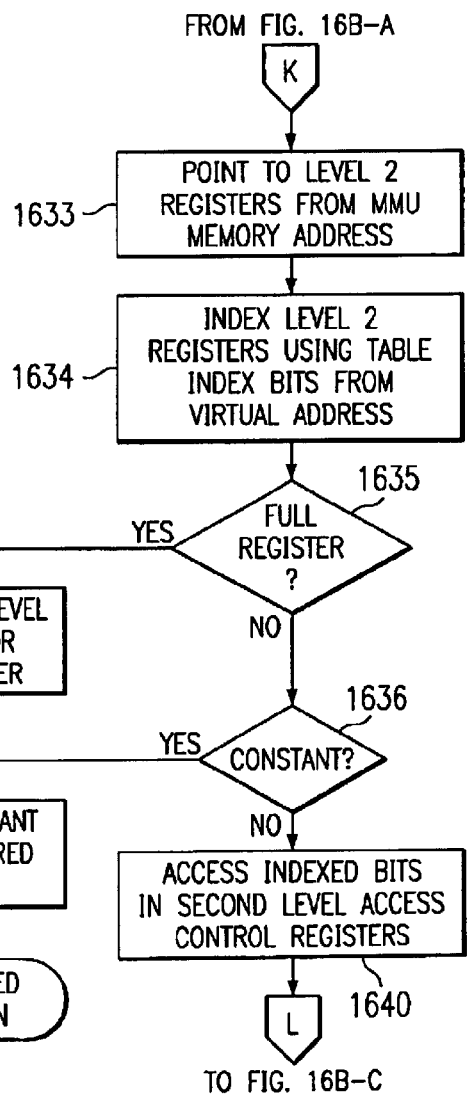
FIG. 16B-D

METHODS AND CIRCUITS FOR SECURING ENCACHED INFORMATION

CROSS-REFERENCE TO RELATED APPLICATIONS

This is a division of U.S. patent application Ser. No. 09/495,813, filed Feb. 1, 2000, entitled "CIRCUITS, SYSTEM AND METHODS FOR INFORMATION PRIVATIZATION IN PERSONAL ELECTRONIC APPLIANCES" by North, Perry, and Kircher, Inventors, currently pending;

"METHODS AND CIRCUITS FOR SELECTIVELY OPERATING A SYSTEM IN A SECURE ENVIRONMENT", U.S. patent application Ser. No. 09/609,597 filed concurrently herewith, and currently pending;

"HAND HELD AUDIO DECODER", U.S. patent application Ser. No. 09/609,023 filed concurrently herewith and currently pending; and "METHODS FOR SYNTHESIZING TRANSLATION TABLES AND SYSTEMS USING THE SAME", U.S. patent application Ser. No. 09/608,072 filed concurrently herewith and currently pending.

BACKGROUND OF THE INVENTION

1. Field of the Invention

The present invention relates in general to electronic appliances and in particular to circuits, systems and methods for information privatization in personal electronic appliances.

2. Description of the Related Art

Handheld personal electronic appliances have become increasingly popular as new technologies have allowed for the production of affordable devices with a high degree of functionality. One such device is the portable digital audio player, which downloads digital audio data, stores those data in a read-writeable memory, and converts those data into audio on user demand. The digital data is downloaded from a network or retrieved from a fixed medium, such as a compact disk, in one of several forms, including the MPEG Layer 3, ACC, and MS Audio protocols. An audio decoder, supported by appropriate firmware, retrieves the encoded data from memory, applies the corresponding decoding algorithm and coverts the decoded data into analog form for driving a headset or other portable speaker system.

In order to prevent the unauthorized download of copyrighted material, such as music segments, some means of controlling the operation of a the personal appliance is desirable. This could be implemented for example through the issuance of passwords or software kernels authorizing download the relevant information. The passwords or software must be secured to prevent end user copying, distribution and tampering. Moreover, the audio decoder may be operating from proprietary firmware which must also be protected against copying or tampering.

In sum, what are needed are methods, circuits and systems for securing information in personal digital appliances. To this end, the ability to secure this information should not depend on where in the appliance it is stored, whether it be in memory internal or external to the primary processing chip. Moreover, implementation of security should not waste resources, such as the available memory space, which could be used more directly for processing operations. Additionally, the security methods and hardware should be applicable to a wide range of different system configurations.

SUMMARY OF THE INVENTION

According to the principles of the present invention, a system is disclosed which includes a central processing unit operating in response to a set of instructions for processing information. An interface is included which provides access to selected circuitry forming a part of the system by an external device. A set of non-volatile programmable security elements selectively enable and disable the operation of the interface to provide a private environment for processing the information. The principles of the present invention provide, among other things the ability to privatize information in personal digital appliances. These principles can be implemented in a manner which does not waste processing resources, such as available memory space, which could be more directly used for processing operations. Moreover, these principles can be applied to a wide range of different system configurations that do not depend on where in the appliance the private information is to be stored, whether it be in memory internal or external to the primary processing chip.

BRIEF DESCRIPTION OF THE DRAWINGS

For a more complete understanding of the present invention, and the advantages thereof, reference is now made to the following descriptions taken in conjunction with the accompanying drawings, in which:

FIG. 2 depicts integrated circuit 100 in a maximum utilization configuration,

FIGS. 7A and 7B are timing diagrams illustrating the operation of the SSI (ADC) in conjunction with selected external devices;

FIG. 13 is a flow chart illustrating a procedure for locking private data in TLB;

FIG. 14 illustrates a cache lockdown procedure for locking secure code into cache;

FIG. 16A illustrates a preferred method of setting-up synthesized translation tables;

FIG. 16B is a flow diagram illustrating a table walk through the synthesized tables of FIG. 16A.

DESCRIPTION OF THE PREFERRED EMBODIMENTS

The principles of the present invention and their advantages are best understood by referring to the illustrated embodiment depicted in FIGS. 1–17 of the drawings, in which like numbers designate like parts.

Figure 1A:
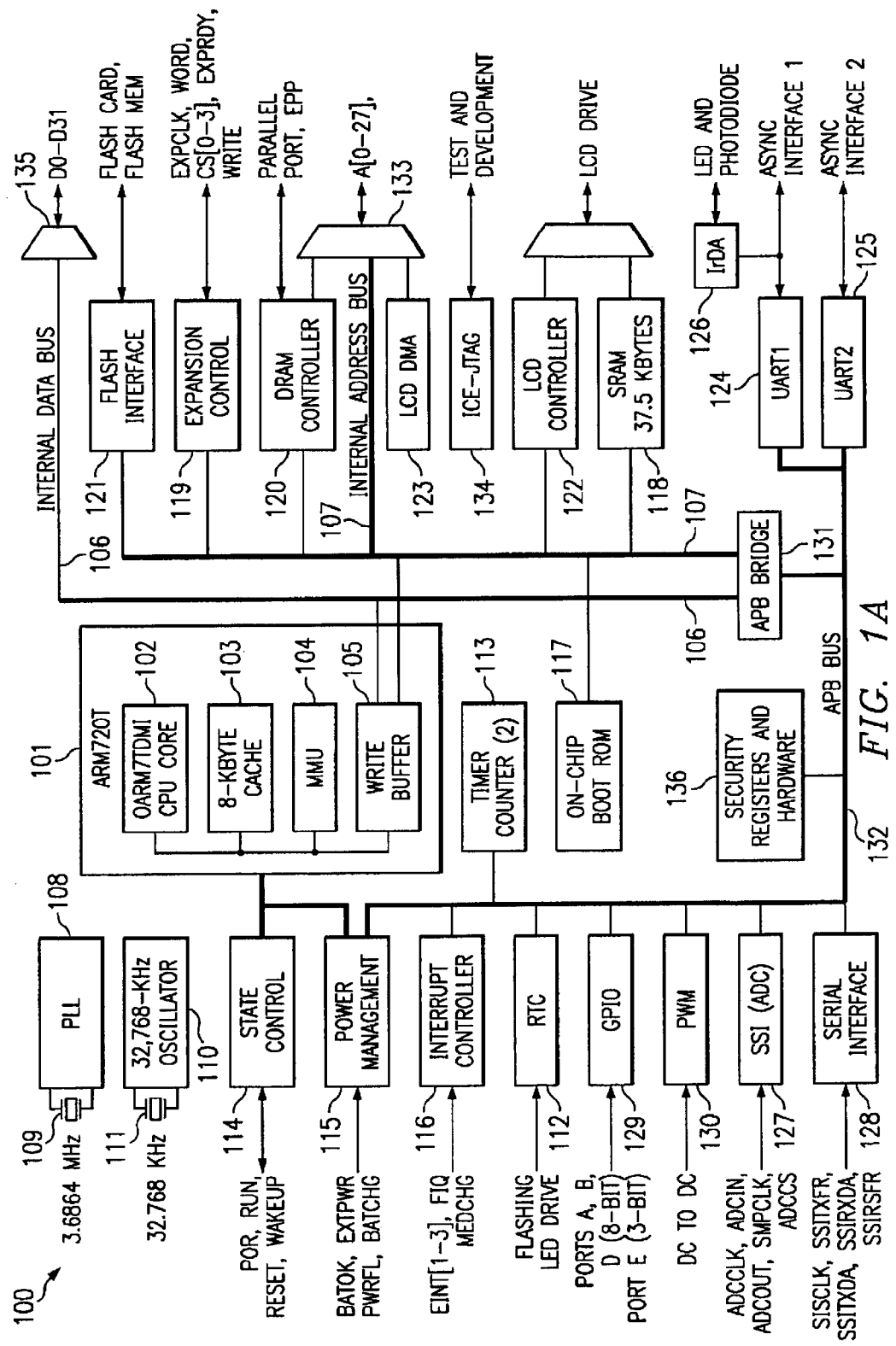
FIG. 1A is a high level functional block diagram of an integrated circuit embodying the principles of the present invention.

FIG. 1A is a high level functional block diagram of an integrated circuit 100 embodying the principles of the present invention. Integrated circuit 100 could be, for example a Cirrus Logic EPxx integrated circuit. Integrated circuit 100 can advantageously be utilized in a number of consumer and industrial handheld information appliances, including personal digital assistants, electronics organizers, and two-way pagers, among other things. In particular, integrated circuit 100 can be configured to perform audio processing in battery powered internet audio decoders.

Figure 1B:
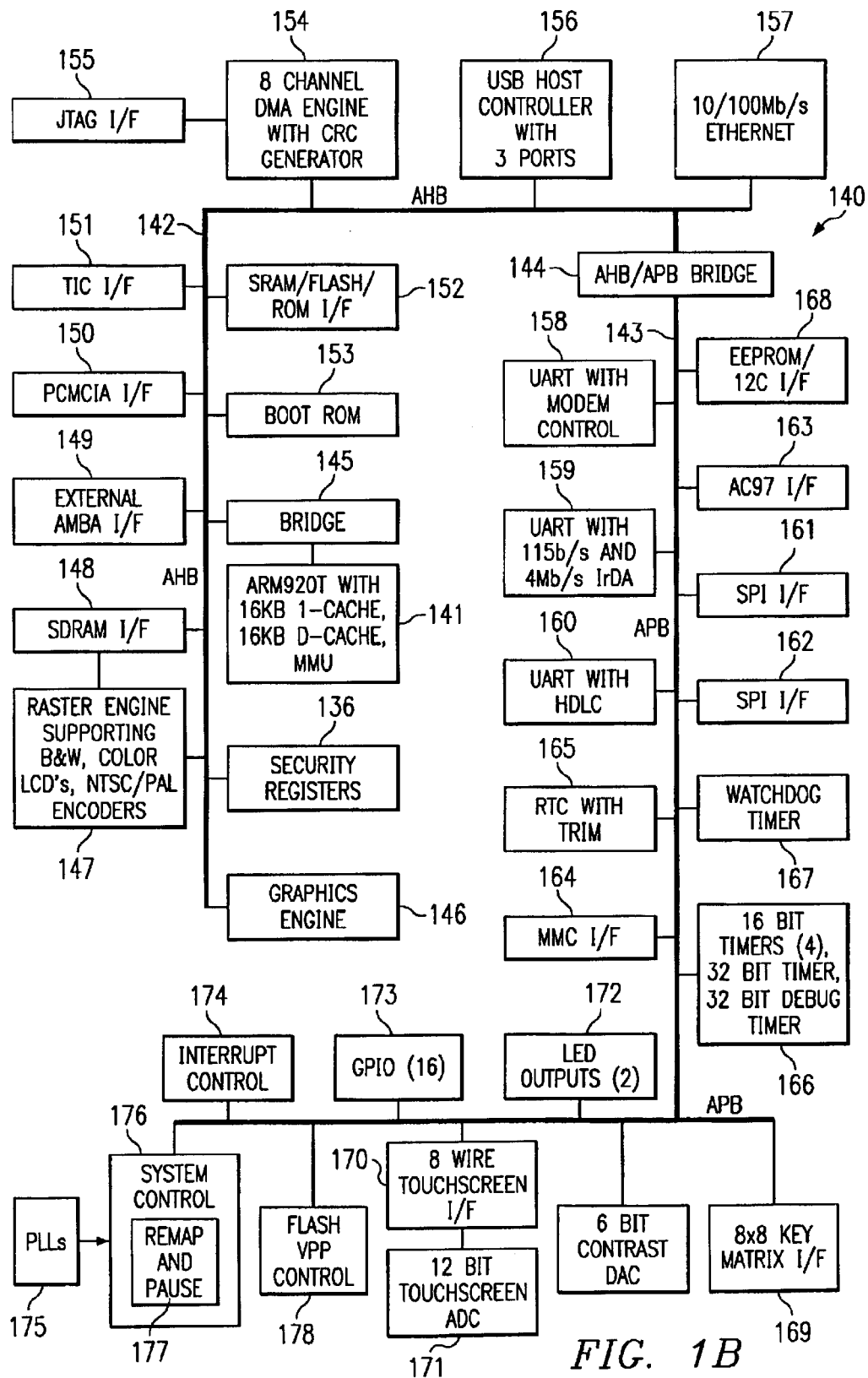
FIG. 1B is a high level diagram of a second system embodying the inventive concepts.
Figure 1C:
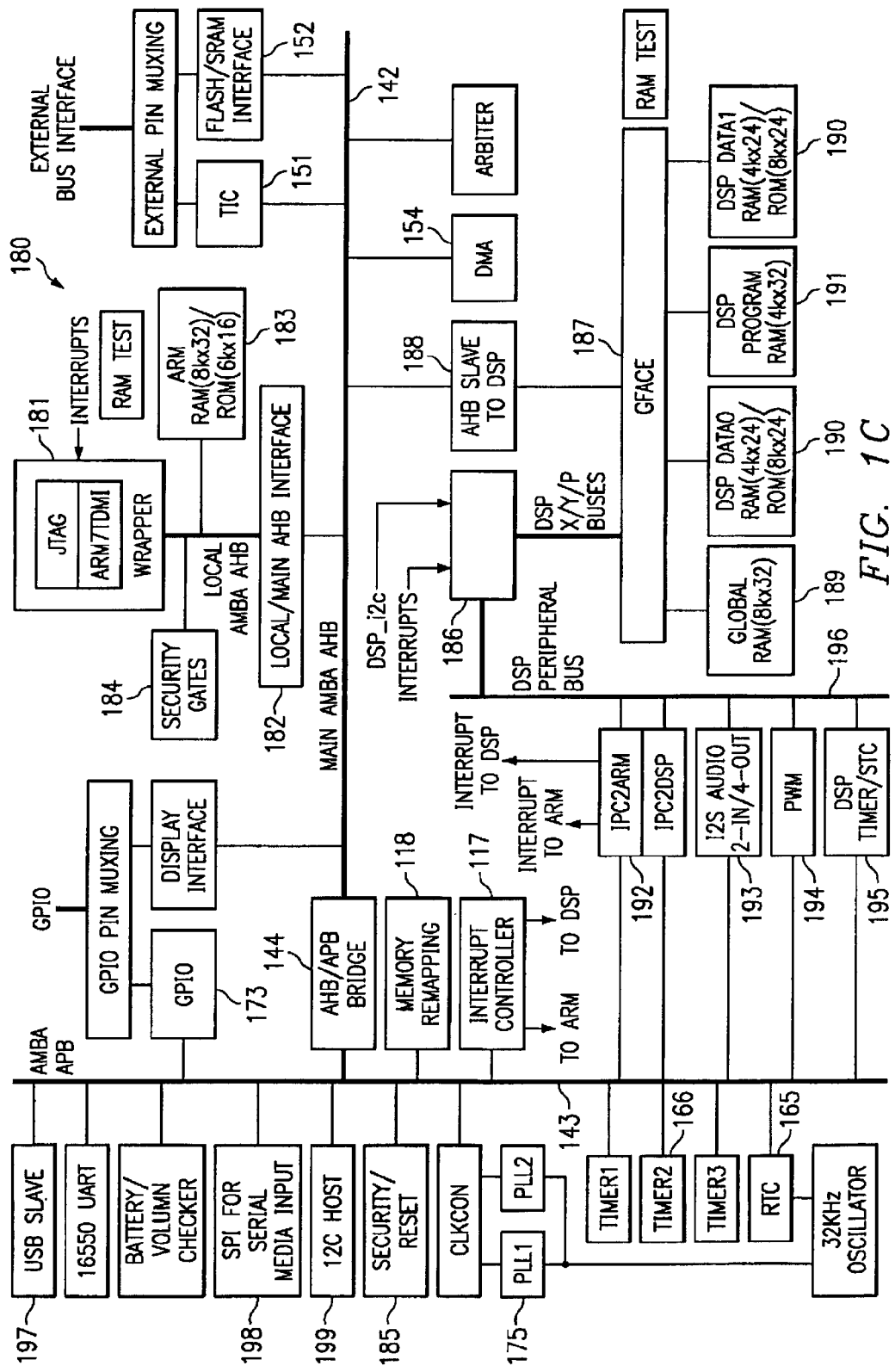
FIG. 1C is a third exemplary system to which the present inventive principles can be advantageously applied; and 1D are two additional.
Figure 3:
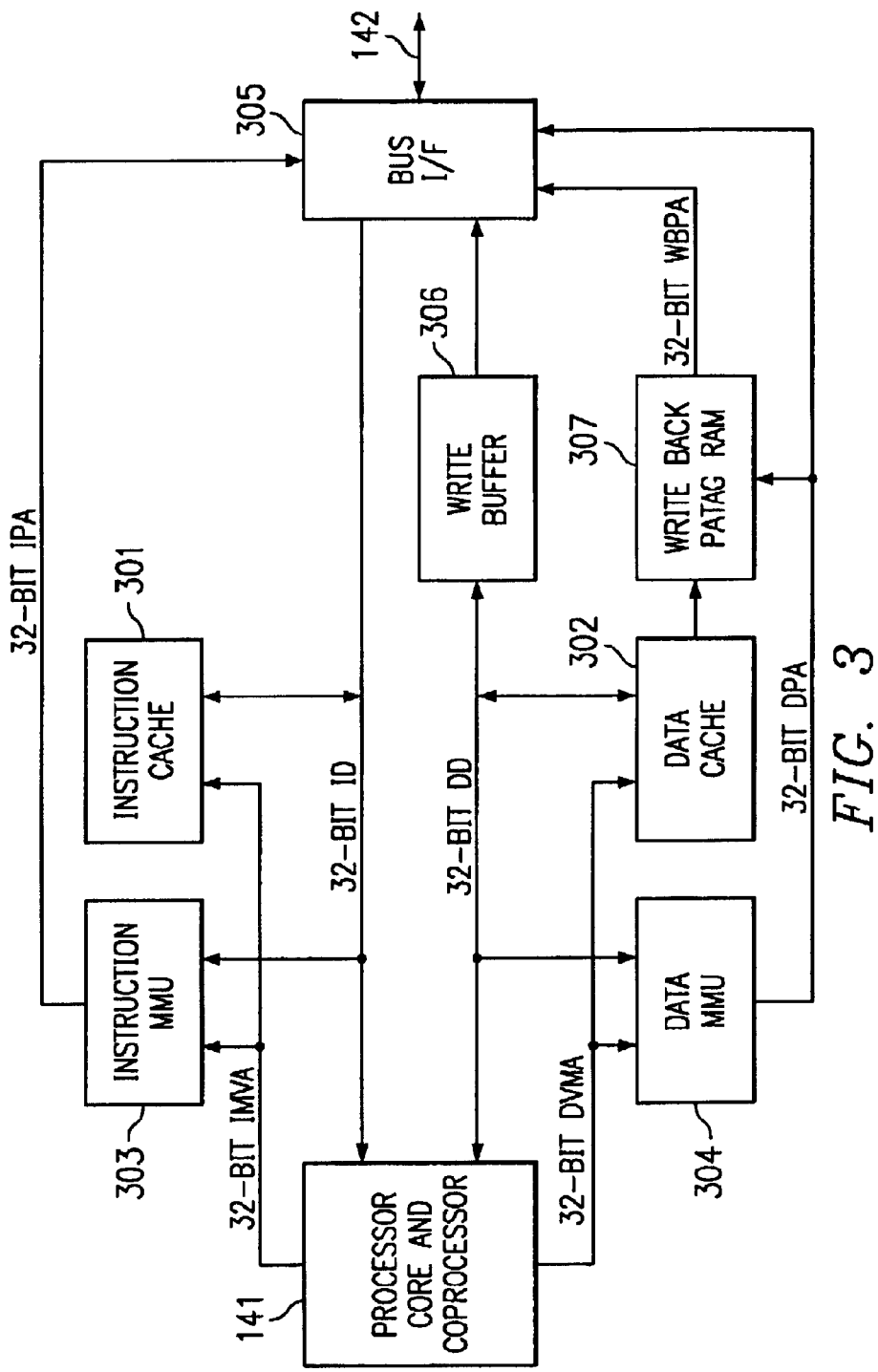
FIG. 3 is a high level functional block diagram of the processor depicted in FIG. 1B.

Two additional exemplary systems to which the present inventive principles can be advantageously applied are shown in FIGS. 1B and 1C and will be discussed further below.

FIG. 2 depicts integrated circuit in a system configuration, and will be referenced during the discussion of the input/output signals (ports) of the various functional blocks of integrated circuit 100.

Integrated circuit 100 is built around an ARM720T processor 101 as described in the ARM720T data sheet available from ARM, Ltd., Cambridge, United Kingdom. Generally, processor 101 includes a central processing unit (CPU) core 102, 8-kilobyte cache 103, memory management unit (MMU) 104 and write buffer 105, each of which will be described in further detail below. It should be noted that in alternate embodiments, an ARM920 processor may also be used.

CPU 102 is a 32-bit microprocessor based on a reduced instruction set computer (RISC) architecture. The associate 8-kilobyte cache 103 is a mixed instruction and data cache (IDC) and is organized as a four way set-associative cache of 512 lines of 16 bytes (4 words).

MMU 104 includes a translation look aside buffer (TLB), access control logic and translation-table-walking logic. The primary functions of MMU 104 are the translation of virtual addresses into physical addresses and the control of accesses to memory. It also supports a conventional two-level page-table structure. Generally, the TLB encaches 64 translated entries and provides the translation to the associated access control logic. If a virtual address causes a hit to a translated entry in the TLB, the access control logic determines whether the access is permitted. In the case of a permitted access, MMU 104 outputs the corresponding physical address from the TLB cache. Otherwise, if the access is not permitted, MMU 104 signals CPU 102 to execute an abort. If a virtual address causes a miss to the TLB cache, the translation-table-walking circuitry retrieves the necessary translation information from a translation table in physical memory. This translation information is written into the TLB cache at a replacement point or entry. The access control logic can then determine whether or not the access is allowed.

Write buffer 105 is used to buffer up to eight words of data and four independent addresses. When enabled, CPU 102 writes data or an instruction into write buffer 105 using an external clock and then returns to instruction execution. Write buffer 105 can then, in parallel, write data onto internal data bus 106 and addresses onto internal address bus 107.

An on-chip phase locked loop (PLL) 108, driven by a 3.6864 MHz crystal 109 is used in one mode to provide the clocks to processor 101. In embodiments where the ARM720T is used, the primary (CPU) clock can be programmed to either 18.432 MHz, 36.864 MHz, 49.152 MHz or 73.728 MHz. (PLL 108 preferably runs at twice the highest possible CPU clock frequency or 147.456 MHz). When the CPU clock frequency is selected to be 36.864 MHz, internal data bus 106 and internal address bus 107 are also clocked at approximately 36 MHz. For CPU clock frequencies above 36 MHz, only processor. 101 runs at the higher clock rate, with internal data bus 106 and internal address bus 107 being clocked at the 36 MHz rate. The CPU clock frequency is selected by programming a two-bit register field in the system control register SYSCON3. (A list of registers internal to integrated circuit 100 is provided as Table 1; a complete description of those registers is found in the Cirrus Logic EP7211 Preliminary Data Sheet, incorporated herein by reference.

Figure 4A:
FIGS. 4A depicts the external clock driving a pin EXPCLK when the clock enable signal on pin CLKEN is asserted with the system entering the Standby State.
Figure 4B:
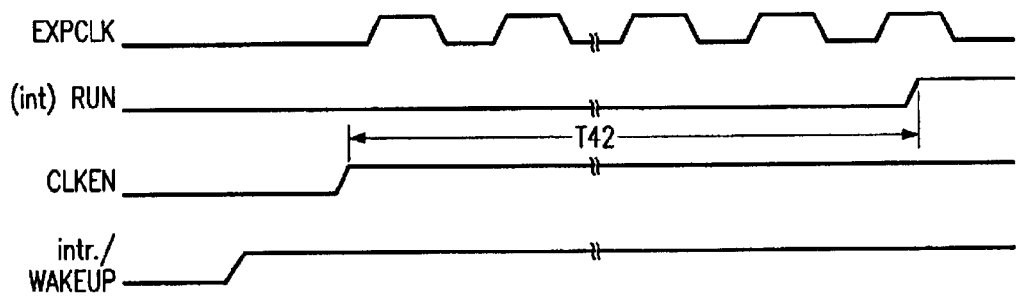
FIG. 4B depicts the external clock driving a pin EXPCLK when the clock enable signal on pin CLKEN is asserted and the system is exiting the Standby State.

It should be noted that integrated circuit 100 also includes and external clock input which allows for the input of an external 13 MHz clock for driving substantially all of the on-chip circuitry in a second clocking mode. The external clock drives a pin EXPCLK when the clock enable signal on pin CLKEN is asserted as shown in FIGS. 4A and 4B, where FIG. 4A shows integrated circuit 100 entering the Standby State and FIG. 4B exiting the Standby State. (The Standby State is discussed further below).

Oscillator 110 is used to generate a 1 hertz clock which is used to drive a 32-bit real time clock generator (RTC) 112. RTC 112 can be written to or read from and includes a 32-bit output match register which allows the issuance of an interrupt when the time in the RTC matches a predetermined specific time. RTC 112 is also used to drive a programmable LED flasher (not shown).

Additionally, integrated circuit 100 includes a pair of on-chip timer counters 113. Each timer counter is independent and includes a 16-bit readable-writeable data register. The given counter is loaded to a desired value and then decrements in response to a preselected clock. When the timer counter underflows (i.e., reaches zero) the appropriate interrupt is generated. The timer counter registers can be read at any time. The clock frequency of these timers can be selected by writing to corresponding bits in the system control registers SYSCON. For example, when PLL 108 is sourcing the internal clocks, 512 kHz and 2 kHz rates are available to timer counters 113. When a 13 MHz clock from an external source is used, 541 kHz and 2.115 kHz clocks are available. Additionally by using a Divide by 26 circuitry, enabled by setting a bit in system control register SYSCON2, a 500 kHz clock can also be generated from the 13 MHz source.

Each timer counter 113 can operate in either a free running mode or a prescale mode by setting or clearing bits in system control register SYSCON1. In the free running mode, the given counter wraps around to 0xFFFF when it underflows (i.e. reaches zero) and continues to count down. In the prescale mode, the value written into the given timer counter is automatically reloaded when the counter underflows. The prescale mode can be used to produce a programmable frequency, drive a buzzer, or generate a periodic interrupt.

Figure 5:
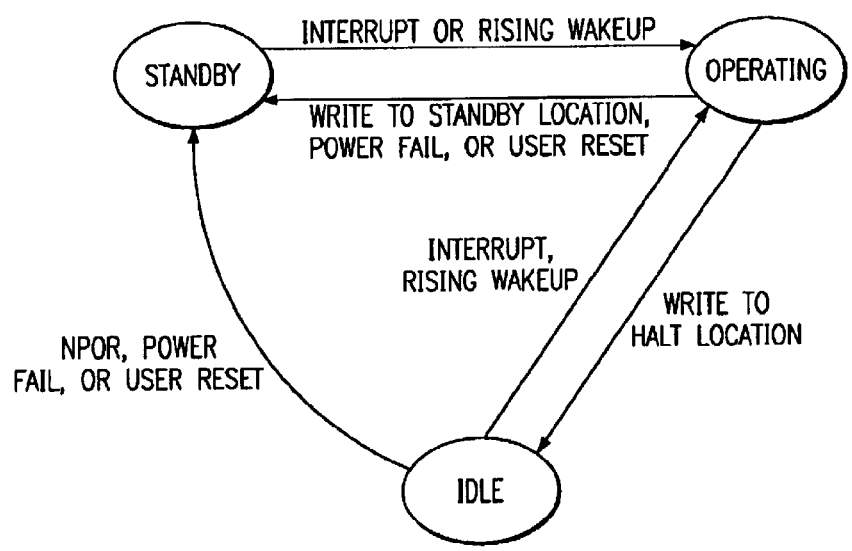
FIG. 5 is a state diagram illustrating the operation of the state control circuitry of FIG. 1A.

State control circuitry 114 allows integrated circuit 100 to be set to either an Operating, Idle, or Standby state. A state diagram illustrating the operation of state control circuitry 114 is shown in FIG. 5. The Operating state is the normal program execution state and all clocks and peripheral logic are enabled. The Idle state is similar to the Operating state with the exception that the CPU clock is halted pending an interrupt or wake-up to return it back to the Operating state. In the Standby state, PLL 108 is shut down, although Crystal 111 and oscillator 110 and RTC circuitry 112 remains active. The external address and data buses are also forced low in the Standby State to prevent any powered down peripherals from draining current. It should be noted that integrated circuit 100 when first powered, or during a cold reset, is forced into the Standby state, which can only be left by external wake-up prompt.

In addition to state control circuitry 114, power management is also effectuated through power management control block 115. The state of various functional blocks of integrated circuit 100 in each state are tabulated in TABLE 12. Power management circuitry 115 forces integrated circuit 100 into the Standby mode when an active low power failure signal PWRFL is received from an external power supply unit 201. If integrated circuit 100 is being driven by an external DC power source 202, the external power sense input signal EXTPWR is driven active low. If a battery 203 is being used, an active high on the BATOK pin indicates that the main battery is OK. The falling edge of this signal generates an FIQ (fast interrupt request) while a low level signal on this pin in the Standby state inhibits system start up. The new battery sense signal BATCHG indicates that a new battery is required; an active low at this input occurs if the battery voltage falls below a "no battery" threshold. The battery powering integrated circuit 100 could be, for example, one or more standard AA batteries widely available to retail consumers.

When unexpected events arise during execution of a program (i.e., an interrupt or memory faults) an exception is usually generated. When multiple exceptions occur, interrupt controller 116, operating on a fixed priority system, determines the order in which the exceptions are serviced.

Integrated circuit 100 operates on two interrupt types, namely the interrupt request (IRQ) and the fast interrupt request (FIQ). FIQs have a higher priority than IRQs. When two or more interrupts of the same type occur simultaneously, the contention is resolved in software. TABLES 2A–2C set out preferred interrupt allocation, wherein INTMR1 and INTSR1 are respectively the First Interrupt Mask Register and First Interrupt Status Register, INTMR2 and INTSR2 are respectively the Second Interrupt Mask Register and Second Interrupt Status Register, and INTMR3 and INTSR3 are the Third Interrupt Mask Register and Third Interrupt Status Register. It should be noted that if two interrupts are received from within the same group (IRQ or FIQ), the order in which they are serviced is preferably resolved in software.

Generally, interrupt controller 116 operates as follows. An external or internal interrupting device asserts the appropriate interrupt. If the appropriate bit is set in the corresponding Interrupt Mask Register, then either an FIQ or IRQ is asserted by Interrupt Controller 116. If the interrupts are enabled, processor 101 jumps to the appropriate address. Interrupt dispatch software then reads the corresponding Interrupt status register to establish the source of the Interrupt and calls the appropriate Interrupt service routine software which then clears the Interrupt source through some action specific to the interrupting device. The Interrupt service routine may then re-enable interrupts, and any other pending interrupts are similarly serviced. All other external Interrupt sources are held active until the corresponding service routine starts executing.

TABLE 3 sets out the external interrupt latencies. In the Operating state, processor 101 checks for a low level on its FIQ and IRQ inputs after each instruction is executed. Hence, there is an Interrupt latency directly related to the amount of time it takes to complete the current instruction after an Interrupt condition is first detected. In the Standby state, the latency will depend on whether the system clock is shut down and if a control bit FASTWAKE in the system control registers is set. As indicated above, PLL 108 is always shut down in the Standby state. If the FASTWAKE bit is cleared, the latency is between 0.125 seconds to 0.25 seconds. If this bit is set however, then the latency will be between 250 microseconds and 500 microseconds. If an external clock is used and disabled during Standby, the latency may also be between 0.125 seconds and 0.25 seconds to allow for oscillator stabilization. If the external clock is not disabled, the latency can be reduced to a few microseconds. An Interrupt can also cause integrated circuit 100 to leave the Idle state. In this case the CPU clock must be restarted and additionally, interrupt servicing may be delayed for instruction execution as described above.

In the illustrated embodiment, an on-chip boot ROM 117 is provided which maintains a set of instructions for initializing integrated circuit 100. On-chip boot ROM also configures UART1, discussed further below, to received 2048 bytes of serial data which are downloaded into on-chip SRAM 118. Once the data has been downloaded into SRAM 118, processor can continue executing instructions by jumping to the start of the SRAM. Advantageously, this configuration allows code to be downloaded to program a system flash memory during the manufacture of a device employing integrated circuit 100. It should be noted that the user may select between booting from on-chip ROM 117 or from an external memory connected to port CS[0]. Specifically, if the signal at pin MEDCHG is low, boot is from on-chip ROM 117 while a high signal applied to this pin requires that boot be performed from the external memory. It should also be noted that the effect of booting from the on-chip boot ROM is a reversal of the decoding of all chip select signals internally. This feature is illustrated in TABLE 5A with the normal, unreversed chip select decoding illustrated in TABLE 5B. Additionally, boot can be accomplished from external memory, with the width of the boot device having a selectable width in accordance with TABLE 4.

The ARM720T processor has a 4 Gbyte address space. In the illustrated embodiment, integrated circuit 100 uses the lower 2 Gbytes of the address space for ROM/RAM/Flash and expansion space. Another 0.5 Gbyte is used for DRAM and the remaining 1.5 Gbytes, less 8K for internal registers, is unused.

A memory and I/O expansion interface supports six separate linear memory or expansion segments to external expansion memory 204. Two additional segments are dedicated to the on-chip SRAM and ROM. Each segment is 256 megabytes in size. Any of the six segments can be used to support a conventional SRAM interface. Moreover, each segment can be individually programed to be 8-, 16- or 32-bit wide, to support page mode accesses, and to execute from one to eight wait states for nonsequential addresses, and zero to three for burst mode accesses. The zero wait state sequential feature allows integrated circuit 100 to interface with burst mode ROMs. It should be noted that the on-chip ROM space is fully decoded while the complete SRAM address space is fully decoded only up to the maximum size of the video frame buffer used to drive an external LCD (up to 128 kBytes).

Two of the expansion segments can be reserved for establishing an interface with two PC Card cards 205 using the chip select signals NCS4 and NCS5. Interface with the external PC cards is preferably made through Cirrus Logic CL-PS6700 PC card slot drivers 206. The memory is segmented to allow different types accesses to take place (i.e., attribute, I/O, and common memory space).

The EXPCLK port to expansion control block 119 outputs an expansion clock which is equal to the CPU clock in the 13 MHz and 18 MHz modes, and has a rate of 36.864 MHz when integrated circuit 100 is operating in the 36, 49, or 70 MHz modes. (EXPCLK port is used as the clock input in the 13 MHz mode discussed above). The EXPRDY pin (Expansion Port Ready) is driven low by the external expansion devices to extend the bus cycle and insert wait states. The chip select signals CS[0:3] are used for SRAM expansions while chip select signal CS[4:5] can be used for either memory expansion or PC card selection. The write strobe WRITE is low during reads from and high during writes to, the expansion devices. The word/halfword bits (2) indicate to the external devices during writes from integrated circuit 100 whether the access size is in words, halfwords or bytes.

DRAM controller 120 provides a programmable 16-bit or 32-bit wide interface to up to two banks 207 of DRAM, with each bank having a storage capacity of up 256 Mbytes. The DRAM banks can be any of a number of types of DRAMs available in the marketplace, including conventional DRAM, synchronous DRAM (SDRAM), extended data out DRAM (EDODRAM), fast page mode DRAM, and double data rate DRAM (DDRDRAM). Moreover, these DRAMs can be of the self-refresh type which are placed in a low power state when integrated circuit 100 enters the Standby state discussed above. To support two banks, two row address strobes RAS[0:1] can be generated along with four column address strobes CAS[0:3]. The output enable signal MOE is used for either the DRAM, ROM/SRAM/Flash or expansion output enable. The write enable signal NWE is used for the same set of external devices. Additionally, DRAM controller includes a programmable refresh counter, with the refresh period by controlled using the refresh period register (DRFPR).

The preferred physical to DRAM addressing is shown in TABLE 6. TABLES 7 and 8 illustrate DRAM address mappings for 32- and 16-bit DRAM memory systems. The 32-bit is assumed to be based on two x16 devices connected to each RAS line with 32-bit DRAM operations selected. The mapping is repeated for every 256 Mbytes in each bank. The placeholder "n" is these tables is equal to 0xC +bank number. The 16/32-bit DRAM selection is programmed by setting a bit in system control register SYSCON2.

Flash interface 121 allows integrated circuit 100 to interface with flash memory, using the chip select signal CS[0:1] described above.

LCD controller 122 provides all the necessary control signals to allow integrated circuit 100 to interface directly to a single panel multiplexed LCD module 209. The total frame buffer size is programmable up to 128 KBytes, using both on and off chip memory. A system can be built using no external DRAM, with on-chip SRAM 118 used as the LCD video frame buffer, as described above. The screen is preferably mapped to the video frame buffer.

LCD direct memory access (DMA) engine 123 is provided for fetching display data for LCD controller 122 from frame buffer memory. The pixel bit rate, hence the LCD refresh rate, can be programmed from 18.432 MHz to 576 kHz when operating in the 18.432–73.728 MHz modes, or 13 MHz to 203 kHz when operating from a 13 MHz clock.

Integrated circuit 100 includes a pair of universal asynchronous receive-transmit (UART) interfaces 124 and 125. These asynchronous ports can be used, for example, to communicate with a pair of RS-232 transceivers 210. Each UART 124/125 can support data rates of up to 115.2 Kbits per second, when integrated circuit 100 is operating from clocks generated by PLL 108. When integrated circuit 100 is being driven from a 13 MHz external clock source, the UART bit rates that can be generated include 9.6 Kbps, 19.2 Kbps, 38 Kbps, 58 Kbps and 115.2 Kbps.

Both UARTs 124/125 include a 16-byte transmit FIFO driving a corresponding transmit (TX) pin and a 16-byte receive FIFO for receiving data from a dedicated receive (RX) pin. An RX interrupt is asserted when a given RX FIFO becomes one-half full or if that FIFO is non-empty for longer than three-character length times with no more characters being received. A TX interrupt is asserted whenever the given TX FIFO buffer reaches one-half empty.

In addition to RX and TX ports, UART 124 (UART1) can also receive the three modem control signals CTS, DSR, and DCD. An additional modem control RI input and output modem control signals RTS and DTR can be implemented using the GPIO ports 129 discussed further below. A Modem Status Interrupt for UART1 is generated if any of these modem control bits change.

UART operation and line speeds are programmable through the UART bit rate and line control registers (UBLC1 and UBLC2). Additionally, four of the FIFOs can also be programmed to have a 1-byte depth. Framming and parity error bits, which are detected at each byte is received, are also readable from 11-bit wide registers.

Integrated circuit 100 also includes an IrDA (infrared data association) SIR protocol post processing stage 126 at the output of UART1 124. It includes a pin for driving an infrared light emitting diode (LED) and an input for connection to a photodiode (shown together as block 211 in FIG. 2). SRI encoder 126 is switched into the TX and RX ports of UART1, such that these signals can drive the infrared interface directly.

Figure 6:
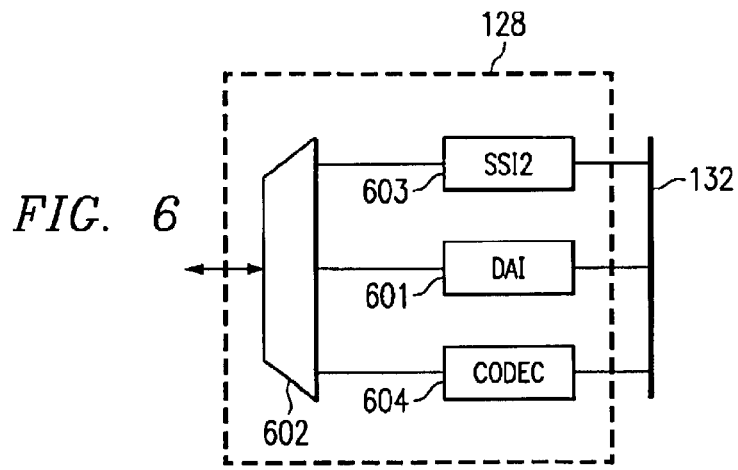
FIG. 6 is a block diagram of the three serial interfaces comprising the serial interface block of FIG. 1A.

Integrated circuit 100 additionally includes an SPI/Microwire master mode 128 Kbps ADC interface 127 and serial interface 128, which is shown in further detail in FIG. 6. A preferred serial pin assignment for the Digital Audio Port is found in TABLE 10. SPI interface 1 (ADC interface) can be used to communicate with an external analog to digital converter 212 and digitizer 213. Serial interface block 128 includes a master slave mode SBI/Microwire (SSI2) interface 603, digital audio interface (DAI) 601, and codec interface 604, all of which are multiplexed through multiplexer 602 onto a single set of external interface pins. The selected interface drives the corresponding circuitry in block 214 of FIG. 2. Multiplexing is controlled by programming corresponding fields in the system control registers. A summary of the available serial interface options is provided in Table 11.

Figure 8:
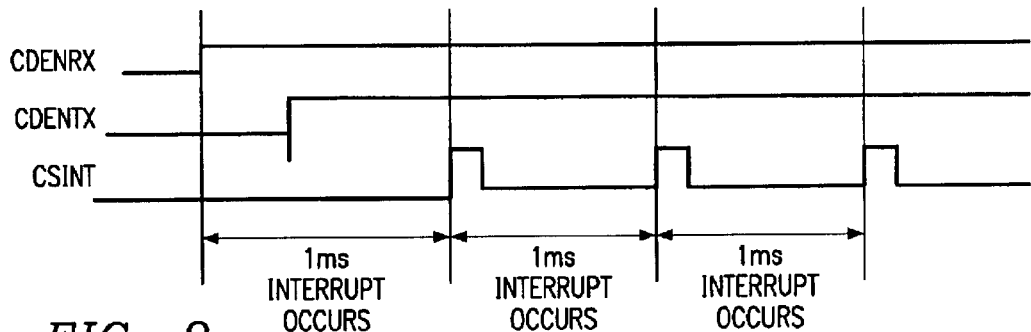
FIG. 8 is a timing diagram illustrating the operation of the Codec interface of FIG. 6.

ADC interface 127 is compatible in a default mode with SSI or Microwire compatible devices such as the MAXIM, MAX148/9 peripherals. ADC interface 127 also can interface with devices such as Analog Devices AD7188/12 chips using NADCCS as a common RFS/TFS line. Exemplary timing diagram when integrated circuit 100 is driving a MAX148/9 and a AD7811/2 are provided as FIGS. 7A and 7B respectively. An exemplary I²S interface is shown in FIG. 8.

The clock output frequencies for ADC interface 127 can also be set using the system control registers. In the 18.432–73.728 MHz operation mode, the ADC clock (ADCCLK) can be set to either 4, 16, 64, or 128 KHz. When integrated circuit 100 is operating in response to a 13.0 MHz externally generated clock, the ADC clock can be set to 4.2, 16.9, 67.7, or 135.4 kHz. The sample clock SMPCLK always runs at twice the frequency of the shift clock (ADCCLK). The available ADC frequency options are set forth in TABLE 12.

The ADC serial output ADCOUT is fed by either an 8-bit or 16-bit shift register in response to a bit set in the SYNCIO register. The ADC serial input channel ADCIN is captured by a 16-bit shift register. The ACD clock synchronization pulses are activated by a write to the output shift register. During transfers an SSIBUSY (synchronous serial interface) busy bit in the system status flag registers the set. When the transfer is complete and valid data is in the 16-bit read shift register, an SSEOTI interrupt is asserted and the SSIBUSY bit is cleared. The sample clock SMPCLK is independently enabled.

Figure 9:
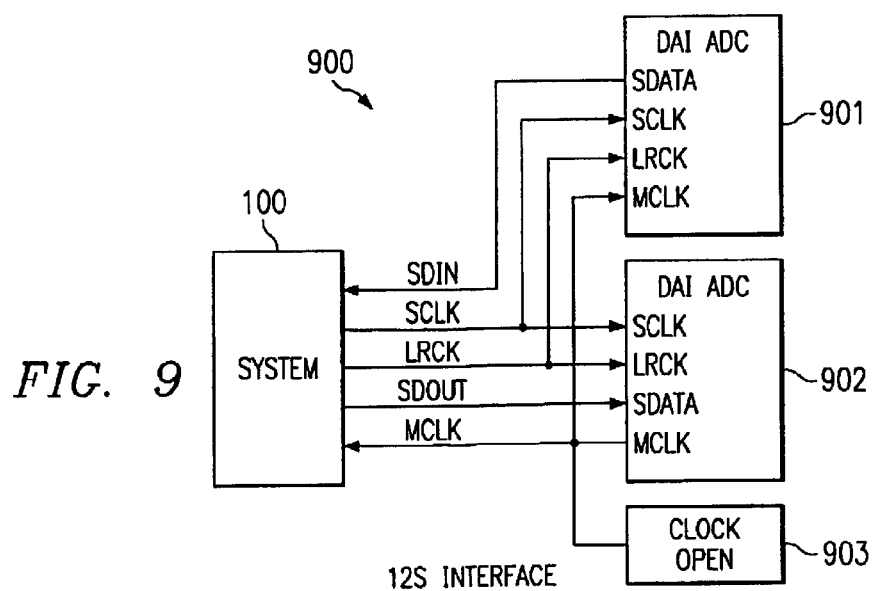
FIG. 9 is a functional block diagram showing an interface between the I²S port of the serial interface block of FIG. 6.

Digital Audio Interface 501 provides an interface to CD quality A/D and D/A converters, such as that shown in FIG. 9. (DAIs are a subset of I²S). 128-bit frames of 16-bit stereo digital audio, at the audio sampling frequency, with separate transmit and receive lines. It should be noted that each frame only contains 16 bits of right channel and 16 bits of left channel audio data. The remaining bits are set to zero.

Figure 10:
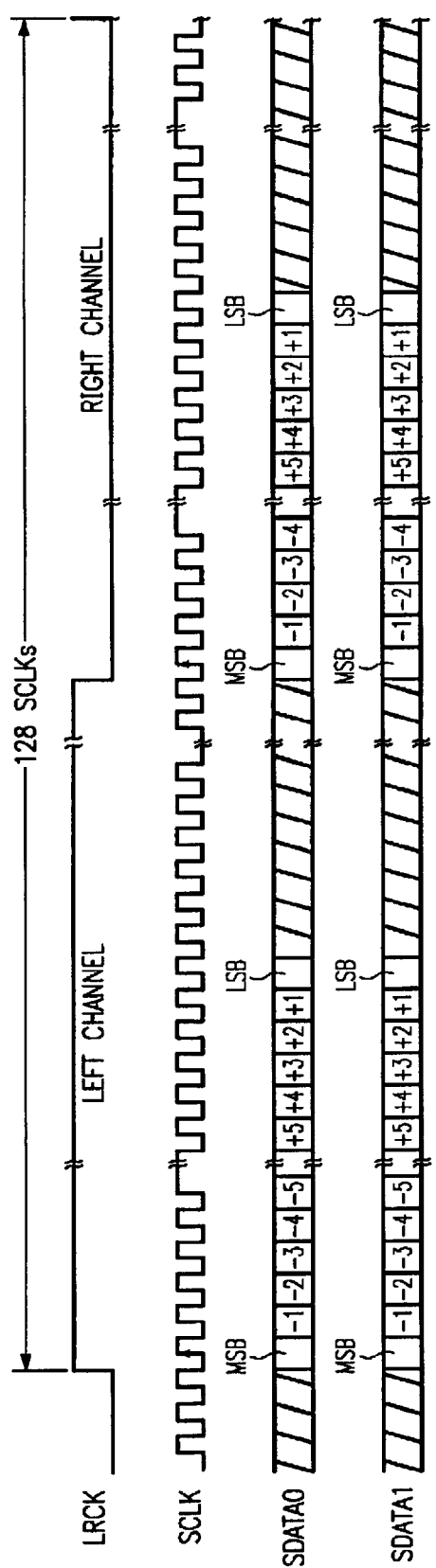
FIG. 10 is a timing diagram illustrating the operation of the I²S interface of FIG. 9.

FIG. 10 is an exemplary timing diagram illustrating the operation of DAI 601. The left-right clock (LRCK) provides the frame synchronization signal. The serial clock (SCLK) is the bit transfer clock and preferably has a rate fixed at 128 times the audio sample frequency. The SDOUT (SDATAO) and SDIN (SDATAI) are respectively used for sending playback data an external D/A converter and for receiving record data from an external A/D converter. Timing between integrated circuit 100, an external D/A converter and/or an external A/D converter is based of the oversampled clock MCLK. Preferably, the MCLK has a rate fixed at 256 times the sampling frequency.

Asynchronous serial interface 2 (SSI2) 503 is an SPI/microwire interface that can operate in a full master-slave mode. FIG. 10 illustrates a pair of integrated circuit 100 devices configured to operate in a Master-Slave fashion. The preferred sustained data rate is 85.3 Kbps, which ensures a sufficiently long period between interrupts. An interrupt is generated when the receive FIFO is half-full and the transmit FIFO is half-empty. In the slave mode, the serial clock (SSICLK) and the serial receive port (SSIRXDA), the received synch control pin (SSIRXFR) and the transmit synchronization pin (SSITXFR) are inputs and the transmit pin SSITXDA is an output. In the master mode, pins SSICLK, SSITXDA, SSITXFR and SSIRXFR are outputs and pin SSIRXDA is an input. Mode selection is through the programming of bits in the system control registers.

Asymmetric (unbalanced) and continuous traffic are both supported through the use of the separate transmit and frame synch control lines SSITXFR and SSIRXFR. In this configuration, the receiving node receives a byte of data on the eight clocks following the assertion of the received frame synch control signal and the sending node transmits a byte on the eight clocks following the assertion of the independent transmit frame synch control pulse. Exemplary timing diagrams illustrating the operation of these two interfaces are provided in FIGS. 7A and 7B for reference.

Codec Interface 604 supports a direct connection to a telephony codec. Along with clock and control signal generation, codec interface 604 also performs parallel to serial and serial to parallel conversions. The interface is full duplex and employs corresponding transmit and receive FIFO operating at 64 Kbs. When enabled, the codec interrupt CSINT is generated every 8 bytes transferred (i.e., FIFO half full/empty) or, in other words, every 1 msec with a latency of 1 msec. This timing is illustrated in FIG. 8, where CDENRX and CDENTX are respectively the receive and transmit control bits in system control register SYSCON1.

DAI 601 supports an I²S interface, such as interface 900 shown in FIG. 9. In this case, both an external ADC 901 and an external DAC 902. A clock source 903 provides the time base. An exemplary timing diagram is provided in FIG. 10. In FIGS. 9 and 10, the MCLK is the oversampled clock which is typically fixed at 256 times the audio sampling frequency. The SCLK is the bit clock which is typically fixed at 128 times the audio sampling frequency. The LCLK is the frame sync signal and is typically fixed at the audio sampling frequency. SDOUT is the audio data output sending playback digital audio to DAC 902. SDIN receives record data from ADC 901.

Figure 11:
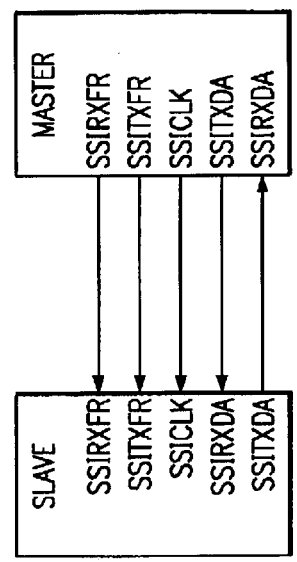
FIG. 11 is a functional block diagram illustrating the use of the SSI2 port of FIG. 6 in a master-slave configuration.

SSI1 interface 603 supports master-slave operation as shown in FIG. 11. This interface provides a means for effectuating full duplex serial transfers between two nodes. Data are transferred in bytes in response to a clock and a frame synchronization signal.

Integrated circuit 100 is also provided with a set of general purpose input output (GPIO) ports 129. In the illustrated embodiment, there are three 8-bit ports and one 3-bit port. The GPIO ports can be used for such purposes as establishing an interface with a keyboard driver 215.

Pulsed with modulator (PWM) circuitry 130 includes two outputs for driving DC to DC 216 converters operating in conjunction with external power supply unit (PSU) subsystem 201. The external input pins normally connected to the output from comparators monitoring the external DC to DC converter output are used to enable these clocks. When integrated circuit 100 is operating from internal PLL 108, the PWM clocks have a frequency of 96 kHz. The duty cycle ratio for these signals can be programmed from 1 and 16 to and 16. The sense of the PWM drive signal active cycle can be set high or low by latching the state of the drive signal during power on reset (i.e., a pull up on the drive signal will results in an active low drive output, and vice versa). As a result, either positive or negative voltages can be generated by the external DC to DC converters. These outputs can similarly be disabled by clearing bits in a control register.

Communication between the blocks of integrated circuit 100 is established through an Advanced Peripheral Bus 132 and an Advanced Peripheral Bus Bridge 131. Internal data bus 106 is 32-bits wide and can be connected to the external devices through multiplexing circuitry 133. Internal address bus 107 is 28-bits wide and can communicate with external devices through multiplexing circuitry 133. ICE-JTAG circuitry 134, which is IEEE 1149.1 compliant, is included for boundary scanning during test and development. Additionally, the Embedded ICE supports the debugging of the ARM processor core.

In the preferred embodiment, the internal registers of integrated circuit 100 are in the little endian configuration. However, integrated circuit 100 can advantageously interface with a big endian external memory system. Specifically, the big end bit and the CPU 101 register sets determines whether words in the external memory are being stored in a big endian or little endian format. Specifically, memory is viewed as a linear collection of bytes numbered upwards from zero. Bytes 0–3 hold the first stored word, bytes 4–7 the second stored word, and so on. In the little endian scheme, the lowest number byte in a word is considered to be the least significant byte of the word and the highest number byte is the most significant word. Thus, byte zero in a little endian system are connected to data lines 7–0. In the big endian scheme, the most significant byte of a word is stored at the lowest numbered byte, and the least significant byte is stored at the highest number byte. Therefore, byte zero in a big endian system is connected to data lines 31–24. In the illustrated embodiment, only the load and store instructions are effected by endian-ness. TABLES 13 and 14 illustrate the operation of integrated circuit 100 for both reads (TABLE 13) and writes (TABLE 14). It should be noted that the column address strobe lines NCAS[3:0] to the DRAM banks are always connected to the same byte lane irrespective of the endianness. For example, column address strobe line NCAS[0] will be associated with data line D[7:0] and NCAS[3] associated with data lines D[31:24]. As a result, in a little endian system, line NCAS[0] will be asserted for a read/write to DRAM byte 0 and in a big endian system, line NCAS[3] will be asserted to access DRAM byte 0.

Integrated circuit 100 includes a set of programmable fuses which allow each chip to be assigned one or more unique ID numbers and passwords. The programmable fuses and related registers are disposed within Security Registers and Hardware block 136 operating off APB 132 (FIG. 1). With specific regards to the embodiment of FIG. 1D, the boot ROM itself will reside on the ARM local bus 107 and the access checking will be split and have logic on both the ARM local bus and within the ARM local-global AHB wrapper.

In the preferred embodiment, the are 256 programmable fuses, including sets of public and private fuses. The addresses and values of the private fuses are hidden such that only private firmware corresponding to those fuses is allowed accesses. In a non-private environment, these addresses and values return all zeros. The public fuses are described in TABLE 15 and the private fuses in TABLE 16.

Integrated circuit 100 also includes embedded hardware within block 136 to check the fused hamming code with the hamming code that matches the selected ID. When the validation address is read, the ID value is matched with it hamming value and verified. The resulting 5 bit code provides debug information (all fuses blown or all fuses not blown) if the hamming codes do not match. Table 17 gives the decoding for the validation read bits. This advantageously allows detects errors which have occurred when the fuses were blown, while preserving the inaccessibility of the fuse values and addresses.

Table 18 provides the addresses that return the validation codes for the public ID-CHK pairs.

Table 19 provides the addresses that return the validation codes for the private ID-CHK pairs. These addresses are only accessible by the firmware when integrated circuit 100 is operating in a private mode and will read 0's otherwise.

In order to allow the hamming code generator to be adequately tested there are two test registers that can be selected as the ID-CHK pair and validated. Their definitions and locations are provided in Table 20.

FIG. 1B is a high level functional block diagram of a second system on a chip 140 suitable for practicing the principles of the present invention. This embodiment employs an ARM920T processor 141 having both instruction and data caches, as well as an MMU. System 141 does not include general purpose SRAM in contrast to integrated circuit 100.

FIG. 13 is a more detailed functional block diagram of processor 141, in particular for those embodiments based on an ARM 920T core. In this embodiment, the available cache comprises both an instruction cache 1301 and a data cache 1302. Similarly, separate instruction and data MMUs 1303 and 1304 are used. The instruction modified virtual address (IMVA), instruction physical address (IPA) and instruction data (ID) buses are each 32 bits wide. Similarly, the data modified virtual address (DVMA), data physical address (DPA) and data data (DD) buses are 32 bits wide. Physical addresses and data are exchanged to AHB bus 142 through AMBA bus interface 1305. A write buffer 1306 allows for the parallel exchange of data through interface 1305 during processor core operations. Data from data cache 1302 can be output through write-back physical address (PTAG) RAM 1307.

Integral to the processor core is a coprocessor which includes a register for translating virtual addresses issued by the CPU into the modified instruction and data virtual addresses (MVA) transmitted on IMVA and DMVA shown in FIG. 1B. Specifically, for addresses to the memory region from 0 to 32 MBytes, the virtual address VA is modified by a 7-bit process identifier as VMA=VA+(ProcID×32 MBytes), where the process identifier ProcID is either a read or write process identifier.

System 141 is based on an internal AHB (Advanced Microcontroller Bus Architecture High-Speed Bus) 142, as well as an internal an APB (Advanced Peripheral Bus) 143. An AHB/APB bridge 144 interfaces AHB 142 and APB 143. A second bridge 145 interfaces processor 141 with AHB 142.

Among the devices operating off AHB 142 are Graphics Engine 146 and Raster Engine 147. Generally, Graphics Engine off-loads such functions as block transfers and line draws from processor 141 to improve system graphics performance. Preferably, Graphics Engine 146 uses a standard Device Independent Bitmap (DIP) format for supporting Windows CE. Raster Engine 147 is provided to raster data from an external display buffer, through synchronous DRAM interface 148, to drive an external LCD, CRT or TV display unit.

Additional on-chip interfaces to internal AHB include an interface 149 for coupling system 141 to an external system bus, a PCMIA for interfacing with an external PC card, and Test Interface Controller (TIC) interface 151 for testing such on-chip circuit blocks as the DMA controller and the raster system. Memory interface 152 provides for the exchange of control signals and data with external SRAM, Flash or ROM in a manner similar to that discussed above. Finally, boot of the system, which will be discussed further below, is effectuated, at least in part, using the Boot ROM 153. In this example, boot ROM 153 is operating off AHB 142, although it could run off any one of a number of global and local buses in alternate embodiments.

System 140 includes an 8-channel DMA engine 154, which prioritizes and services request by on-chip resources, such as the UARTs, for accesses to external memory. The Joint Test Action Group (JTAG) port 155 supports debugging of the on-chip processor and related circuitry Additionally, a Universal Serial Bus (USB) controller 156 and Ethernet port 157 operate directly from the AHB.

A number of peripheral devices are provided on-chip and operate off of APB 143. Among other things, system 140 includes three UARTs 158, 159 and 160. Additionally, a pair of SP1 interfaces 161 and 162 and an AC97 interface 163 are included in the illustrated embodiment. A real time clock (RTC) 165, general timer set 166 and watchdog timer 167 are also provided in this embodiment. An additional memory interface, EEPROM interface 168, also couples to the APB.

Manual input of data can be made through an external key matrix coupled to Key Matrix Interface 169, or a Touchscreen interfacing with Touchscreen ADC 171 and Touchscreen Interface 170. LED outputs 172 are also included in the system 140 user interface.

Similar to integrated circuit 100, system 140 includes a set of general purpose input/output (GPIO) ports 173, an interrupt controller 174, and on-chip PLLs 175 driving system control circuitry 176. Control circuitry includes memory remap and system pause control circuitry 177. Flash VPP Control block 178 generates the voltages required for writing and erasing external flash.

FIG. 1C is a high level functional block diagram of another exemplary system-on-a-chip 180 to which the principles of the present invention can be suitably applied. In this instance, the CPU core 181, which could be for example a ARM7TDMI controller, does not utilize an MMU or on-chip cache. CPU 181 operates in conjunction with the AHB bus 142 via a local AHB bus and Local/Main AHB interface 182. CPU 181 is supported by memory 183, security gates 184 and security/reset circuitry 185. Security will be discussed in further detail below.

In this embodiment, system 180 additionally includes a digital signal processor (DSP) 186 supported by global memory 189, data memory 190 and program memory 191. Interprocessor communications registers 192, I²S Audio Input/Output Port 193, PWM circuitry 194 that is capable of driving external speakers at CD quality levels without using analog DAC support circuits, and DSP Timer/STC 195 communicate with DSP 186 via DSP Peripheral Bus 196. These devices also operate off the APB. Among the peripheral devices also operating from the APB include a USB Slave Port 197, SPI for Serial Media Input 198 and I²S Host Port 199.

The Motion Picture Expert Group (MPEG) audio compression standard defines the syntax for a coded stream of digitized audio data, along with a process for decoding that stream. In the audio arena, three layers, Layers I–III respectively, are defined. For purposes of the present discussion, Layer III, which provides the highest quality audio reproduction, will be considered.

The encoding process begins with the sampling of one or more audio channels at a given sampling rate, which may be 32, 44.1 or 48 kHz. The resulting digitized stream is passed through a polyphase filter bank which divides the received time-domain stream into 32 frequency subbands. Typically the filter bank operates of 64 input samples at a time with 50% overlap such that 32 output frequency-domain samples are produced for 32 input time-domain samples.

A psychoacoustic model is used to remove those parts of the audio signal which cannot be heard by the human ear due to auditory masking. Auditory masking is the characteristic of the human auditory system wherein a strong audio signal renders a temporally or spatially close weaker audio signal imperceptible. Moreover, the ability of the human ear to distinguish sounds is frequency dependent. Within certain critical bands, the ear does not precisely delineate between various in-band audio components. The processing subbands, which approximate these critical hearing bands, are quantized as a function of the audibility of the quantization noise within that subband.

The psychoacoustic model engine, operating in parallel with the polyphase filter, determines the available noise masking for a given frequency component and a given loudness. From this information, the data stream output from the polyphase filter are quantized and coded. In Layer III, each of the 32 subbands output from the polyphase filter are passed through a window which parses the stream into long blocks of 18 samples or short blocks of 6 samples, with 50% overlap such that the window lengths are respectively 36 and 12 samples wide. Long blocks are used to achieve better frequency resolution for the relatively constant components of the audio signals while short blocks are used for improved frequency resolution of transients. The blocks for each subband are then processed with a Modified Discrete Cosine Transform (MDCT). The subbands are further divided in frequency to improve spectral resolution such that some of the aliasing caused by the polyphase filter can be canceled.

In MPEGx, Layer III, the quantization is non-uniform to make the signal to noise ration over the range of quantization values more consistent. Additionally, Layer III utilizes scale factor bands of approximating critical band widths and cover several MDCT coefficients. The scale factors are used during noise allocation to vary the frequency-dependent masking threshold, and essentially set the gain for each subband. Moreover, Huffman encoding is performed on the quantized MDCT coefficients for improving data compression. Finally, a "bit reservoir" is employed, to which bits can be donated when less than the average number of bits are required to code a frame and from which bits can be borrowed when more than the average number of bits are required to code a frame.

Frames are formed from a header, a CRC value, side information and main data, although the relative position of these components of the frame are not necessarily always in the same sequence, or even adjacent in the stream. The header includes a set of frame sync bits, MPEG version and layer identifiers, a CRC protection bit, a bitrate index indicating the bitrate at which the frame was created, and a sampling rate frequency index indicating the frequency at which audio data was sampled, and along with additional information about the transported data.

An MPEG-1, Layer III bitstream can then be decoded generally as follows. Data is input to the decoder in a predetermined number of frames per second. The frame sync bits in the header portion of each frame is detected. Next, the scale factors are extracted and decoded. This is followed by decoding of the Huffman encoded main data representing the frequency energies. The scale factors are applied and the data requantized. At this point, if stereo data is being processed, the stereo channels are recovered and aliasing reduction performed. An inverse MDCT operation is performed to followed by an overlapping inverse Discrete Cosine Transform (DCT) to return the data to the time-domain. A low pass filter is applied to recover the PCM samples, each of which is essentially a weighted average of the adjacent 512 time-domain samples.

When integrated circuit 100 is configured as an MPEGx, Layer III decoder, a stereo DAC, such as a Cirrus Logic CS43Lxx Stereo Audio DAC, is coupled to Digital Audio Port 128 for driving a set of headphones. An analog to digital converter, such as a Cirrus Logic CS53L32 Audio A/D Converter may also be coupled to this port for the input of data from a microphone. This embodiment of FIG. 1D includes an on-chip PWM circuit that can drive headphones at CD quality levels without an external stereo audio DAC.

It is often necessary to prevent tampering, copying or logic analyzer examination of the software and firmware bundled with an electronic product. As a result, some level of security must be provided, for example through the use of encrypted passwords, which allow the manufacturer authorized end users access to the system memory assets for purposes of downloading, debugging, and upgrading the software or firmware, but denies that same level of access to unauthorized end users. In the context of a digital audio player, this will allow online music distributors the confidence to allow end users who have paid the royalty and received the requisite passwords to download songs, with the knowledge that unauthorized downloads will at least be deterred to some degree.

Generally, there are several criteria a security scheme must meet. First, the system must not allow unauthorized access as a result of power-on reset. Second, secure information, such as encrypted passwords, security code, and the information concerning locations in memory where the secure information resides, must not be readily accessible outside the system. Notwithstanding, this secure information must be checked during production test procedures to guarantee acceptable end user system quality with regards to normal manufacturing defects. Finally, if security measures are not provided or not invoked, normal operation of the system should proceed in the expected fashion.

Advantageously, the principles of the present invention provide security techniques which allow integrated circuit 100 to meet each of these criteria. In accordance with one such technique, the capability of processor 101, in response to either certain default conditions or the dynamic assertion of certain instructions, to reverse the Chip Select signal decoding discussed above is employed. By reversing the chip select decoding on power-on reset, the security code can be run from a normally unaccessible memory space. Moreover, this feature of processor 101 can only be invoked in a specific period of time when processor 101 is not executing instructions, which further complicates any attempted security breach.

Figure 12C:
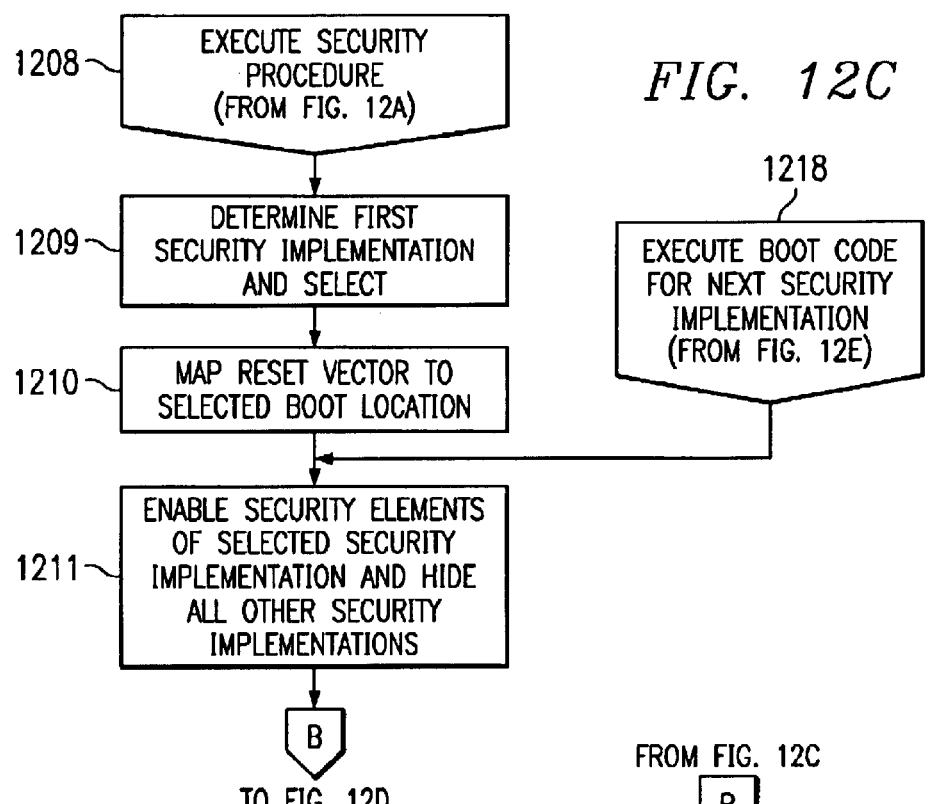
FIG. 12 is a flow chart describing system initialization at power-on reset.
Figure 12D:
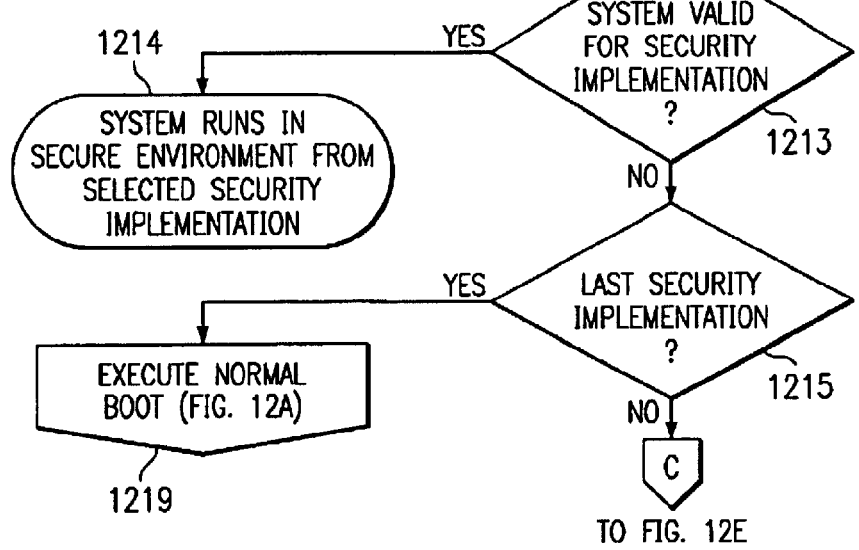

FIG. 12 is a flow chart illustrating a preferred procedure 1200 for booting integrated circuit 100 in accordance with the inventive concepts. It will be assumed that processor 101 is an ARM720T or ARM920T processor, and signal names will be in reference to the signals and/or instructions thereof. The procedure begins with the power on reset of integrated circuit 100 by the assertion of the power-on reset (NPOR) signal, at Step 1201. Circuits within the system immediately disable all hardware and debug features and hides all security elements (e.g. firmware, registers, passwords) from external probing (Step 1202). This step insures that the system is secure, at least up until Step 1203, where a check is made to determine if security firmware routines are in place and enabled. In the preferred embodiment, this is accomplished by reading the programmable fuse registers.

For purposes of discussion, the case where security is not provided or is disabled will be considered first. At Step 1204, a determination is made as to whether boot is to continue from an internal ROM or if an external memory will be used. For the ARM processor embodiments, the NMEDCHG bit is used to select between internal and external boot memory options. If at Step 1204, the signal at pin NMEDCHG is clear (i.e. in an active low state), then boot of integrated circuit 100 will be from internal ROM. In this case, the address mapping to internal boot ROM is reversed by default at Step 1205. After reversal of the address mapping, execution is from current boot ROM location 0 (Step 1207). In this illustrated embodiment, the power-reset signal NPOR must be asserted to return the address mapping to its normal state.

Alternatively, if the NMEDCHG bit is set (i.e. in an active high state), then boot will be from external memory (ROM/EPROM/Flash). In this case, the chip select mapping is set as shown in TABLE 5A with the external Chip Select 0 being selected as the boot memory.

Next, consider the case where a read of the programmable fuse registers indicates that a security routine is in place and enabled. Boot branches at Step 1208 to the execution of the security procedure.

Integrated circuit 100 can be configured to respond to different sets of boot and/or security code. This advantageously allows integrated circuit 100 to operate using the boot/security firmware from multiple vendors, even though the secure information of each vendor may only be accessible by that vendor's own boot/security procedures. Initially, the boot memory is programmed with multiple boot code sets or options. This can done using the internal boot ROM or one or more chips of external memory (ROM/RAM/Flash). With multiple boot options, the end user will be able to select between security firmware available from different vendors.

Consequently, at Step 1209 a first one of the booting options in boot memory is identified and at Step 1210 aliased to the reset vector, typically location 0x00 for the first option. All necessary security elements (registers, firmware, I/O devices) required for the given implementation are enabled by the current boot option while all other security options (implementations) are kept hidden (Step 1211). The selected boot code is then run by the processor at Step 1212 to attempt to initialize for the selected security firmware/software.

If at Step 1213 the proper security firmware/software is found in memory as called by the boot code, then integrated circuit 100 completes boot and runs in the selected secured environment at Step 1214 under supervising control of the security firmware/software. On the other hand, if the required security firmware/software is not found, another boot option must be tried.

If the last security option has not been reached at Step 1215, then the next security option in boot code is selected (Step 1216). An instruction is issued which dynamically forces the processor to the new reset vector. In this instance, the reset vector jumps to point to the second security option in boot code. At Step 1218, the processing returns to Step 1211 and the boot process is attempted again. It should be noted that in the illustrated embodiment, the instruction pipeline has three stages. Consequently, the instruction resetting the program counter to 0 has already been loaded from internal boot ROM before execution of the instructions that changes the chip selects. The MOV pc, #0 instruction causes the processor pipeline to be flushed thereby allowing several cycles to occur before the change of chip selection must occur. During this process, no other accesses are allowed to those memory resources whose chip select signals will change during the execution of the remap command.

This process repeats itself until either a security option is found which causes integrated circuit 100 to enter secure operation at Step 1214 or the last security option is reached at Step 1215. In the illustrated embodiment, the last or default option returns the boot procedure at Step 1219 back to a normal (unsecure) boot. Here, all the debug features are enabled and the security features are hidden at Step 1220. At Step 1221, a default boot ROM is selected and at Step 1222 the processor is dynamically forced to the reset vector. Notwithstanding, in alternate embodiments, default security code may be provided in order that integrated circuit 100 can still run in a secure environment even though all of the primary options are unavailable.

In embodiments of integrated circuit 100 based upon an ARM 920T, instructions and data can be locked into the corresponding instruction and data caches, such that they are not chosen as victims for replacement by the replacement algorithm on a cache miss. Locked in data/instructions guarantee a cache hit with the corresponding information being fetched directly from cache and the favorable cache access latency. Moreover, the locked encached information is unaccessible outside of integrated circuit 100, except through the JTAG port or other test-debug modes that allow visibility to the cache or TLB memories. The JTAG port, used primarily during product development and testing, can be disabled integrated circuit 100 leaves the manufacturing floor.

Before locking cache entries, the corresponding descriptors (physical addresses and permissions) must be locked in the associated Translation Look aside Buffers (TLBs) to obtain predictable performance results. In addition to cache, many devices, such as the ARM 920T used in the present examples, include both data and instruction translation lookaside buffers (TLBs). For a given instruction or field of data, the CPU generates a virtual address. A modified virtual address is then presented to the corresponding TLB and a comparison is performed between fields of the modified virtual address and the comparison (tag) registers in the TLB. If a match occurs, and the access is allowable, (as determined by the permission fields in the TLB entry), the physical address bits returned from the corresponding TLB entry is used, along with index bits from the modified virtual address, to generate a physical address, accessing cache or external memory, as required. If a miss occurs, the process discuss below is invoked to translate the virtual address into a physical address in hardware.

When cache lines are locked, the corresponding entries in the data and instructions TLBs should also be locked and exempted from replacement during TLB update. In the case of the ARM 920T processor, TLB entries are locked by writing identifiers for the specific entries in the data and instruction TLBs being locked into TLB Lock Down field of the System Control Processor register C15.

TLB Lockdown procedure 1300 of FIG. 13 is one method of locking entries in either an instruction or data TLB. At Step 1301, a page table is setup including physical address bits and permissions corresponding to the protected data or instructions. At least some of the entries in the target TLB are then flushed or cleaned to insure that the code to be locked is not already in the TLB registers (Step 1302).

In embodiments employing the ARM 920T processor, both the data and instruction TLBs are organized in a single segment of 64 lines. A replacement (victim) counter points to the entry being replaced. Therefore, at Step 1303, the replacement counter is updated to point to the next entry to which locked information is to be written. In the preferred embodiment, the process begins at entry 0.

For the instruction TLB a Prefetch instruction is used to generate a modified virtual address force a TLB miss (Step 1304). In the case of the data TLB, a Load instruction can be used to force the miss. After the miss has occurred, a page table walk must be performed to generate the descriptor (e.g. physical address and permissions) to be loaded into the TLB (Step 1305). At Step 1306, the descriptor generated from the page table walk, using physical address bits from the accessed page table entry and index bits from the modified virtual address, is loaded into the given TLB at the entry pointed-to by the current replacement counter contents.

In the ARM 920T embodiments, the loaded TLB entry is locked at Step 1307 by setting a bit in a corresponding TLB Lockdown register. If the last entry has been reached at Step 1308, the procedure ends, otherwise, at Step 1309, the procedure loops back to Step 1303 and the replacement counter updated in preparation to load the next entry.

Once the TLB entries are locked, the corresponding data or code can be locked in cache. For purposes of discussion, consider the case where instructions are locked into the ARM 920T instruction cache. The case of the data cache is similar. It should also be noted, that the inventive concepts are not limited to systems employing ARM processors, and can be applied to any system or device including Lockable instruction and/or data cache.

FIG. 14 illustrates a cache lockdown procedure 1400 for locking secure code into cache. As will be discussed further, in order to perform the locking operation, a cache miss must be forced in the illustrated embodiment. A preferred method of forcing a cache miss is discussed later in conjunction with FIG. 15.

At Step 1401 an actual or emulated page table is set up with the physical addresses to the locations in memory where the data or instructions to be locked in cache reside. An emulated and synthesized page tables embodying the inventive concepts are also discussed further below. This table is used to update the corresponding TLB, preferably using procedure 1300.

At Step 1402, the given cache is flushed or cleaned of at least some cache lines to insure that the code to be locked-in is not already encached. The replacement (victim) counter associated with the cache is forced to point to the first cache line (cache line 0) at Step 1403. In the preferred embodiment, each of the data and instruction caches is partitioned into 8 64-line segments each indexed by index fields in the modified virtual address. In procedure 1400, cache lines will be filled sequentially, with for example, all cache lines 0 of all segments filled in sequence first, followed by the sequential fill of all cache lines 1, and so on.

The data or instructions to be encached are generated, possibly requiring a decryption process (de-encrypted), and stored at corresponding locations in an alternative memory, such as internal SRAM or external SRAM/DRAM/Flash at Step 1404. Then, at Step 1305, a Prefetch Cache Line operation is performed for an instruction encache to invoke a look-up at the pointed-to cache entry. (For the data cache, the LOAD instruction can be used). This causes a cache miss thereby requiring the processor to access the alternate memory containing the necessary data or instructions. It can do this by referring to the TLB for the necessary bits for the physical address, if the TLB is current and accurate, or by walking through the page tables set up at Step 1401 directly. The physical address itself is generated from base address bits in the entry accessed in the TLB and index bits from the virtual address.

At Step 1405, the generated code or data is placed where the cache miss is to be processed and a line fill is performed at Step 1406 to the cache line at the current replacement pointer entry. Again, the cache segment is indexed by cache segment index bits from the virtual address causing the cache miss.

If, at Step 1407, the last segment in the given cache not been reached and further cache operations are required, the processor increments the cache segment index bits at Step 1408 to force the next cache access to the next cache segment at the current replacement counter value. The procedure returns to Step 1404 and continues from there. However, if the just completed operation was to the last cache segment, and more cache operations are to follow (i.e. the last cache line to be filled has not been reached at Step 1409), then at Step 1410, the procedure jumps back to Step 1403, the replacement counter value is updated, and the procedure continues from that point.

When all the code to be locked-in has been loaded, the Replacement Counter base is set to a value one higher that the base to the locked cache lines (Step 1411). This insures that the private data (now decrypted) will not be overwritten on a cache miss or become accessible by an unauthorized party. The code can then be executed from cache at Step 1412.

One means of creating locked, encached data without using memory locations for the entire region to be locked is to use a cache line's length of registers to emulate the region. In addition, cache miss emulation can also be used to remedy hardware limitations on the cache locking granularity. For example, in the ARM 920T embodiment, cache can be locked in 64 word blocks (256 bytes). Each cache line however is only 8 words (32 bytes) long, and therefore can be mapped a different locations within the 64 word block, depending on the address bits.

According to the inventive concepts, for each lockable location, eight (8) programmable 32-bit emulated cache line (ECLINE) registers are set up in an alternate location in memory as eight contiguous 32-bit locations. Additionally, a comparison (offset) register (ECOFFSET) is setup which is programmed with physical addresses to identify where in the cache memory space the ECLINE register contents will reside after the emulated cache miss. Consequently, the location a single cache line in size can be used to represent an entire 64 word Lockable location.

Figure 15A:
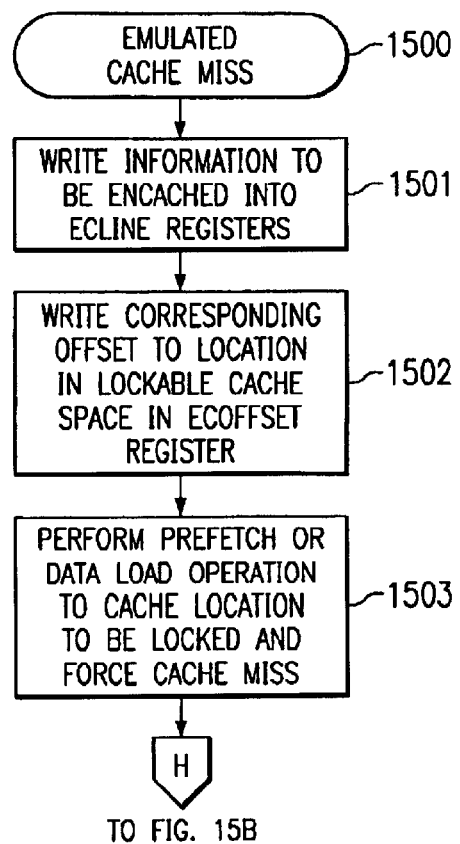
FIG. 15 is a flow chart in which an emulated cache miss procedure is set forth.
Figure 15B:
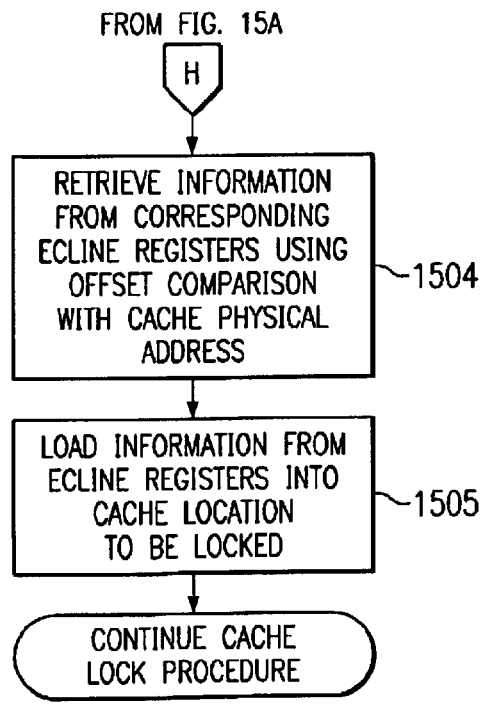
Figure 17A:
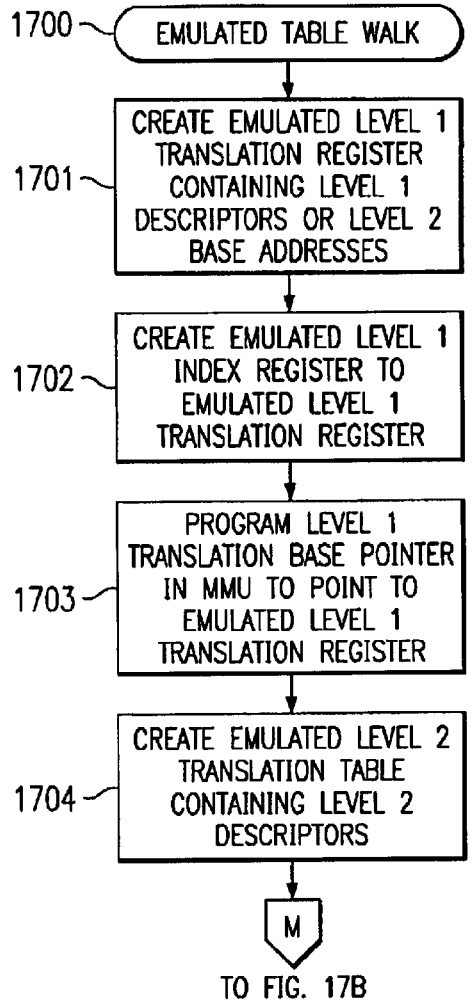
FIG. 17 illustrates a preferred procedure for performing an emulated table walk.
Figure 17B:
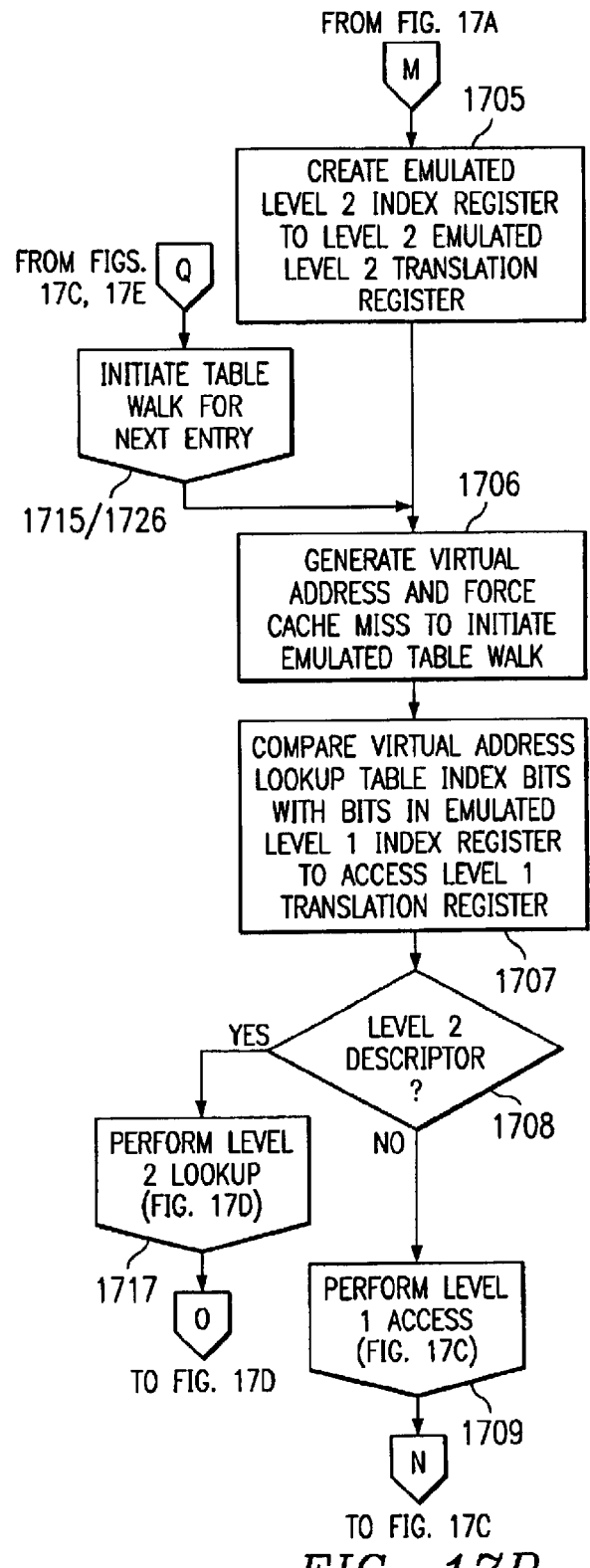
Figure 17C:
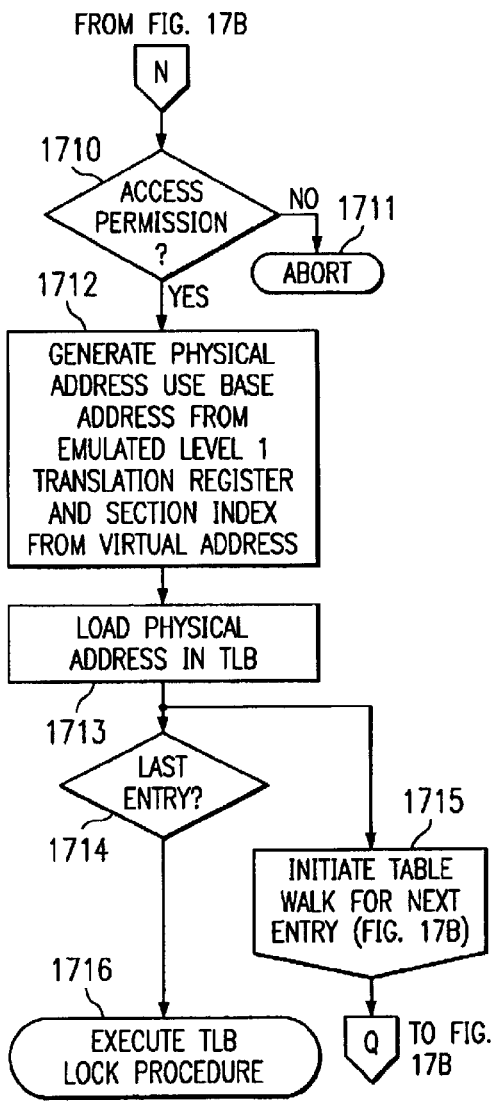
Figure 17D:
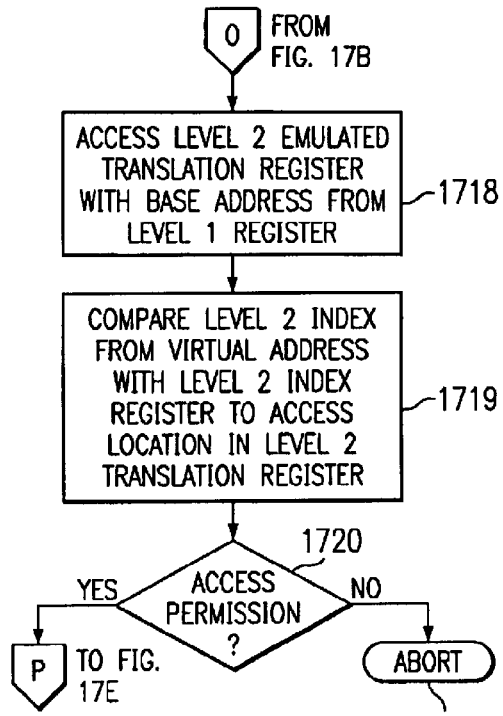
Figure 17E:
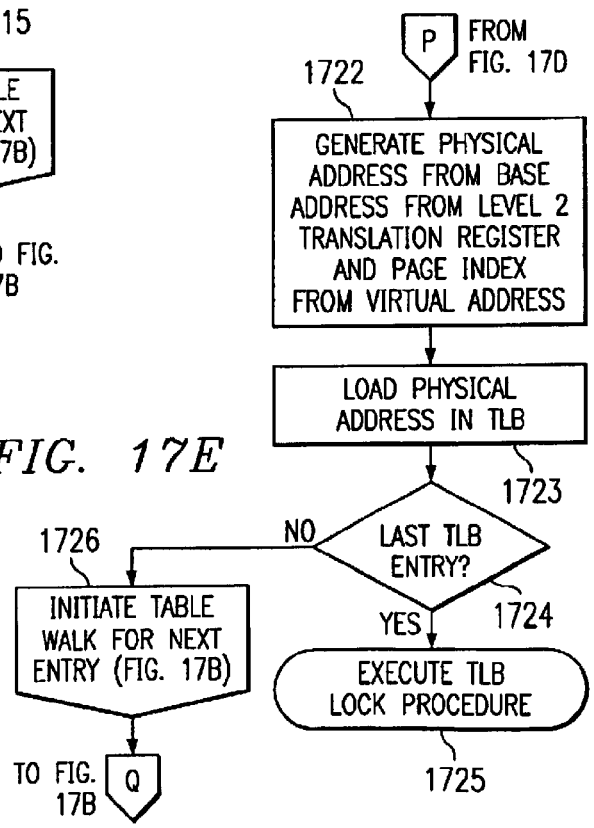

An emulated cache miss procedure 1500 is then set forth in the flow chart of FIG. 15. At Step 1501, the contents to be encached (in either the instruction or data cache) are written into the ECLINE registers. An offset to the Lockable cache space to which the data are to be written is then programmed into the ECOFFSET comparison register (Step 1502).

At Step 1503, an operation is performed to cause a cache miss For the instruction cache, this can be done through a Prefetch Instruction for the instruction cache, and for the data cache, through a Load. The virtual address generated to this location causes a miss to the given cache, and the corresponding physical address is then generated using index bits from the virtual address and base bits retrieved from the appropriate TLB or alternatively, through a page table walk. At Step 1505, the information in the corresponding ECLINE registers is retrieved and at Step 1506, loaded into the cache at the addressed entry. This entry is now prepared to be locked using procedure 1400. Advantageously, the procedure has allowed the locked portion of cache to be loaded without resort to either internal or external SRAM.

As already indicated, page table walks are required during cache and TLB locking operations in order to generate addresses to physical memory from where the data or instructions are to be retrieved. The present inventive concepts allow for the creation of streamlined page tables which save on the amount of memory which must be dedicated to page table support. Moreover, even in view of a TLB miss, the inventive concepts also protect data and instruction code against tampering, copying or electronic analysis through secure operation of MMU 104 during address translation by section/page table walks. Again, an ARM 920T processor core will be considered for illustrative purposes, although the inventive principles can be applied to the memory management schemes of other processors and memory management units.

A conventional page table walk for this embodiment generally proceeds as follows. During the Level 1 fetch, a section descriptor (Level 1), course page table or fine page table base address is retrieved from a 4096-entry Translation Base Table (TBT). The TBT is accessed using a TBT base address from the Translation Base Register and a Table Index field from the modified virtual address.

If the output from the TBT is a section descriptor, that descriptor includes a Section Base Address and access permissions. A physical address to a 1MByte section of memory is then generated using the Section Base Address bits from the Level 1 descriptor and Section Index bits from the modified virtual address. (Assuming that the permissions contained in the Level 1 Section Descriptor are favorable).

A Course Page Table Base address from the TBT, along with Level 2 Table Index bits from the modified virtual address, accesses one of 256 entries in the Course Page Table thereby dividing the 1 Mbyte blocks into 4 Kbyte blocks. The Course Page Table returns either a Large or Small Base Address along with access permissions. Depending on the state of the permissions, the Large or Small Page Base Address bits are combined with Page Index bits from the modified virtual address to produce a physical address either a 64 Kbyte large page or 4 Kbyte small page from memory.

A fine page base address from the TBT, along with Level 2 Table Index bits from the modified virtual memory address, points to a 1024 entry Fine Page Table. The output from this table is a Level 2 Descriptor which includes either a large, small or tiny base address along with access permissions. Large pages are 64 kBytes, small pages 4 KBytes and tiny pages 1 Kbyte. Assuming the permissions indicate that the access is allowed, the page base address is concatenated with Page Index bits from the modified virtual address to generate a physical address to either the large or small pages in memory already discussed, or 1 kbyte tiny pages in memory.

The memory accessed as a result of the page table walk can be either cache, internal memory or external memory. The physical addresses and permissions are used to update the TLB. Any secure information is then locked, as described above, into the TLB.

The disadvantage of this two-level table walk procedure comes from the fact that the various tables require substantial amounts of on-chip memory. As previously discussed, secure information must reside inside the system in areas of the memory not accessible by an unauthorized user. Therefore, some provision must be made for efficiently storing sensitive information, such as the physical address translation scheme, within the available internal memory.

In the preferred embodiment of integrated circuit 100, the table walking process can be significantly simplified and the amount of memory required for the translation tables greatly reduced. Not only is this important in terms of increased operating efficiency, but it also insures that resort to unsecure external memory is not required.

Here, the memory space is divided up into 256 MByte regions, each of which is associated with a common set of access characteristics. (e.g. access permissions, cacheability, bufferability). Of only one of these regions, only 1 MByte requires a second level page table. Thus, since large regions of memory have common access characteristics, much smaller translation tables can be created within the available SRAM space.

The access permissions indicate whether given information can be accessed from the corresponding memory block. The cacheability and bufferability attribute bits are used to determine if an accessed piece of information can be stored in cache or transferred through the write buffer. For example, the contents of the real hardware registers controlling the UARTs and other peripherals and I/O devices are generally not allowed to be cached or buffered by the CPU subsystem. This would cause incorrect behavior of these peripherals due to the timing of when the accesses would actually occur.

Moreover, for a secure system the page/section table information must be kept within the confines of the private area such that this information can not pass from memory to the device pins that can be examined by a logic analyzer.

In the illustrated embodiment, where the memory is divided into 16, 256 Mbyte blocks, a 32-bit register is created for storing the Level 1 AP bits, each two bit pairs mapping to a 256 MByte memory region. For example bits [1:0] map to Region 1, bits [3:2] to Region 2, and so on. A 16-bit register is setup for holding a set of bits indicating the cacheability of each region for Level 1. Another 16-bit register is setup for holding either a set of bits indicating the cacheability of each region. These registers are pointed to by the contents of the Translation Base Register in the MMU.

A procedure 1600 for updating these registers, as well as for handling memory regions which have unique characteristics and constants, is shown in FIG. 16A.

For a given 256 Mbyte region, a determination is made at Step 1601 as to whether it has a common set of access characteristics. If the determination is affirmative, then at Step 1602, the corresponding entry in the global Level 1 AP register is loaded with the appropriate AP bits. The corresponding entries in the global Level 1 bufferability and cacheability registers are similarly updated at Steps 1602 and 1603.

At Step 1605, the procedure returns for the update of the register entries for the next memory region (block) requiring update. Initialization/update of the global access control registers is preferably done in a loop. The values in general do not change but can be updated if necessary during system processing. The full register values for entries that are not to be synthesized are updated as appropriate during system operation. For example they will need updated when a page of memory is substituted for another when it is "swapped" out to disk or similar mass storage devices.

For those memory blocks or registers which have a unique set of access characteristics at Step 1601, including access permissions, bufferability and cacheability bits, and physical address bits, a full 32-bit register is loaded with a complete Level 1 descriptor at Steps 1606 and 1607. The procedure again loops back at Step 1608. This descriptor can include a course or fine page (Level 2) table address. Otherwise, a constant is pointed to in hardwired gates at Step 1608. The stored constant can be a fixed value or a base address to a Level 2 table. If a walk to Level 2 is not required at Step 1609 then the procedure loops back at Step 1610. Otherwise, at Step 1611, a corresponding register in the Level 2 synthesized table is set up at Step 1611.

A similar process is used to synthesize Level 2. Specifically, for each Level 2 page, a register pointed-to by the Level 2 base address bits from the Level 1 registers A global Level 2 AP register, along with Level 2 bufferability and cacheability registers are set up as before, for pages and sub-blocks having common characteristics.

For a given page or set of pages, a determination is made at Step 1612 as to whether it has a common set of access characteristics. If the determination is affirmative, then a Step 1613, the corresponding entry in the global Level 2 AP register is loaded with the appropriate AP bits. The corresponding entries in the global Level 2 bufferability and cacheability registers are similarly updated at Steps 1614 and 1615.

At Step 1616, the procedure returns to Step 1601 for the update of the register entries for the next memory region (block) requiring update.

For those Level 2 pages, sets of pages, blocks or registers which have a unique set of Level 2 access characteristics at Step 1612, including access permissions, bufferability and cacheability bits, and physical address bits, a full 32-bit register is loaded with a complete Level 2 descriptor at Step 1618. Otherwise, a constant is pointed to in hardwired gates at Step 1618. The stored constant can be a fixed value, base address, or the like. The procedure again loops back at Step 1619 to Step 1601.

An exemplary synthesized page table walk is illustrated in FIG. 16B. At Step 1620, the table walk is requested. This request could be in response to a TLB and/or cache miss. In this example, consider first the case where a second level of Table walk is not required at Step 1621. The Level 1 registers discussed above are then pointed-to by the translation base register in the MMU at Step 1622. The Level 1 register entries are indexed using the table index bits from the virtual address (Step 1623).

At Steps 1624 and 1625, a determination is made as to whether the return from the indexed entry in the Level 1 registers is either a full descriptor or a constant. The case in which the return is neither a constant nor a full descriptor will be considered first.

At Step 1626 the access control bits in the first level global access registers (i.e. the AP, cacheability and bufferability bits) are retrieved. The table index from the virtual address are then transformed into physical address bits at Step 1627 by moving bit positions relative to the virtual address.

In the preferred embodiment, the transformed virtual address bits for section entries will be the table index bits (bits 13:2 of the lookup word index into the 4096 entry level 1 page table) become bits (31:20) of the result for the entry (1 Mbyte memory region). The domain of the section will be defined by bits (13:10) of the memory location. For embodiments using the ARM920 or ARM720 MMU), several bits in the page table entries are always a constant 0 or 1.

The Level 1 descriptor is formed at Step 1628 by merging the transformed address bits and the retrieved access control bits. The synthesized descriptor is returned at Step 1629 for updating the TLB and or cache.

Returning to Steps 1624 and 1625, the Level 1 entry can also be a full descriptor (Step 1630), or a constant (Step 1631). The descriptor or constant can be used immediately at Step 1632.

Assume next that a Level 2 table reference is required at Step 1621.

The Level 2 translation is similar to that performed when only a Level 1 reference is required. At Step 1633, the Level 2 registers, setup as described above, are pointed to by a base address in the MMU. The specific register or entry is indexed using the table index bits from the virtual address at Step 1634. A determination is made at Steps 1635 and 1636 as to whether the indexed register (entry) contains a full descriptor or a constant. If a descriptor is found, then that descriptor is retrieved at Step 1637 and if a constant is found, that constant is retrieved at Step 1638. The descriptor or constant can then be immediately used at Step 1639.

If at Steps 1635 and 1636, neither a constant nor a descriptor is found, then at Step 1640, the second level access control registers are accessed and the corresponding access control bits retrieved at Step 1641 using the page index bits from virtual address. At Step 1642, the page index bits from the virtual address are transformed into physical address bits by shifting bit positions. These physical address bits, along with the retrieved access control bits are merged at Step 1643 to form a synthesized descriptor. The synthesized descriptor is returned at Step 1644 for updating the TLB, performing a memory upon a cache miss, or similar operation.

It should be noted that for brevity that the synthesized table walk has been described in terms of only Level 1 and Level 2 descriptor generation. It should be noted however, that additional levels of walk through below the second level can be implemented by repeated application of the inventive principles.

In sum, according to the inventive concepts, only a 32-bit AP register and a pair of 16-bit registers for bufferability and cacheability are needed as first level tables. A second level table composed of a small page AP register and one-bit cacheability and bufferability registers is all that is required for each second level page that must be addressed.

The inventive concepts also advantageously allow for address translation and TLB update upon a cache miss through register emulation of memory similar to the cache miss emulation. Subsequently, the cache and/or TLB entries can be locked as described above for security. The preferred emulation process employs an alternate, emulated memory, such that the integrated circuit 100 internal memory can be spared for other tasks. The memory addresses of the page tables are preferably mapped inside the integrated circuit. A preferred procedure embodying these concepts is the Emulated Table Walk/TLB Update procedure 1700 illustrated in FIG. 17.

First, an emulated Level 1 Translation Register (table) (EL1TR) containing either Level 1 Descriptors or Level 2 base addresses is created at (Step 1701). Additionally, an emulated Level 1 Index Register (EL1IR), maintaining indices to the entries in the EL1TR, is setup in the alternate memory space (Step 1702). The Translation Base Table (TTB) in the MMU is programmed to point to the emulated Level 1 table. Requests to this region will receive the contents of EL1TR with the index into the table matches EL1IR. If the index does not match the value returned will be an entry that causes an exception to occur.

For those address translations continuing past the Section level, an emulated Level 2 Translation Register (EL2TR) containing Level 2 Descriptors is created in alternate memory (Step 1704), along with an emulated Level 2 Index Register holding the corresponding indices (Step 1705).

At Step 1706, virtual address is generated by prompting CPU 101 or through the use of an external address generator. If the cache and TLB have been flushed or cleaned, a cache/TLB miss will occur, and therefore, at Step 1707, the table walk procedure is invoked using the emulated level 1 table pointed-to by the MMU. Level 1 Table Index bits in the virtual address are compared with those in EL1IR and the corresponding Level 1 information returned from EL1TR (Step 1708).

If the information is a descriptor (i.e. no Level 2 translation is required) at Step 1708, then a Level 1 access is performed (Step 1709) wherein the permissions in the descriptor are examined (Step 1710). If permission is not granted, then the operation aborts at Step 1711. Otherwise, the physical address is generated from the Section address bits in the Level 1 descriptor, along with the Section Index from the virtual address, at Step 1712. The physical address can then be loaded into the TLB at Step 1713 to await locking and the corresponding data or instruction loaded into the appropriate cache. If it is determined at Step 1714 that the current entry in the TLB is not the last to be loaded, then at Step 1715 the procedure loops back to Step 1706 to initiate the next table walk. Otherwise, the TLB locking procedure is executed at Step 1716.

If the information from EL1TR is found to be a base address to Level 2 at Step 1708, the Level 2 page walk is invoked at Step 1717. The EL2TR registers are accessed (Step 1718) using the base address from EL1TR. The specific register is indexed using the contents of corresponding EL2IR register by comparison against the index bits from the virtual address (Step 1719). The permissions in the returned Level 2 descriptor are examined at Step 1720. If the access is not allowed, the access is aborted at Step 1721, otherwise the physical address is generated at Step 1723 using the physical address bits from the Level 2 descriptor and index bits from the virtual address. The physical address is loaded into the TLB at Step 1723 to await locking.

If the current TLB entry is the last to be loaded at Step 1724, the TLB lock procedure can be invoked at Step 1725, otherwise, at Step 1726 the procedure jumps back to Step 1706 and the table walk for the next TLB entry is initiated.

In some embodiments of integrated circuit 100, a bare CPU may be employed which does not include a Memory Management Unit (MMU) or hardware cache. For example, CPU core 101 could be based upon an ARM7tdmi processor 102 alone, without cache 103 or MMU 104. When this option is selected, all software must be stored in memory in a flat memory space. However, this may require the use of external memory (e.g. NOR Flash, SRAM, DRAM). As discussed above, the data in an external memory has the significant disadvantage of potentially being accessed or analyzed by an unauthorized end user.

In the embodiment of integrated circuit 100, which does not employ either a hardware cache or an MMU, the security code runs in an supervisor mode. In the supervisor mode, access to specific areas of memory and certain registers are subject to a check against supervisor privilege. The security firmware preferably runs from internal memory, such as SRAM. In the supervisory mode, all other software/firmware is interpreted as running in the user mode and is therefore subject to supervisor privilege checking by the secured software.

Although the invention has been described with reference to a specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore, contemplated that the claims will cover any such modifications or embodiments that fall within the true scope of the invention.

TABLE 1

| Address | Name | Default | RD/WR | Size | Comments |
|---|---|---|---|---|---|
| 0x8000.0000 | PADR | 0 | RW | 8 | Port A data register |
| 0x8000.0001 | PBDR | 0 | RW | 8 | Port B data |
| 0x8000.0002 | — | — | — | 8 | Reserved |
| 0x8000.0003 | PDDR | 0 | RW | 8 | Port D data |
| 0x8000.0040 | PADDR | 0 | RW | 8 | Port A data direction register |
| 0x8000.0041 | PBDDR | 0 | RW | 8 | Port B data |
| 0x8000.0042 | — | — | — | 8 | Reserved |
| 0x8000.0043 | PDDDR | 0 | RW | 8 | Port D data direction register |
| 0x8000.0080 | PEDR | 0 | RW | 3 | Port E data |
| 0x8000.00C0 | PEDDR | 0 | RW | 3 | Port E data |
| 0x8000.0100 | SYSCON | 0 | RW | 32 | System |
| 0x8000.0140 | SYSFLG | 0 | RD | 32 | System status flags register 1 |
| 0x8000.0180 | MEMCFG1 | 0 | RW | 32 | Expansion and ROM memory configuration register 1 |
| 0x8000.01C0 | MEMCFG2 | 0 | RW | 32 | Expansion and ROM memory |
| 0x8000.0200 | DRFPR | 0 | RW | 8 | DRAM refresh period register |
| 0x8000.0240 | INSTR1 | 0 | RD | 32 | Interrupt status register 1 |
| 0x8000.0280 | INTMR1 | 0 | RW | 32 | Interrupt mask register 1 |
| 0x8000.02C0 | LCDCON | 0 | RW | 32 | LCD control |
| 0x8000.0300 | TC1D | 0 | RW | 16 | Read/Write |
| 0x8000.0340 | TC2D | 0 | RW | 16 | Read/Write |
| 0x8000.0380 | RTCDR | — | RW | 32 | Realtime clock data register |
| 0x8000.03C0 | RTCMR | — | RW | 32 | Realtime clock match register |
| 0x8000.0400 | PMPCON | 0 | RW | 12 | PWM pump control register |
| 0x8000.0440 | CODR | 0 | RW | 8 | CODEC data I/O register |
| 0x8000.0480 | UARTDR1 | 0 | RW | 8W/11R | UART1 FIFO data register |
| 0x8000.04C0 | UBLCR1 | 0 | RW | 32 | UART 1 bit rate and line |
| 0x8000.0500 | SYNCIO | 0 | RW | 32 | Synchronous serial I/O data register for master only SSI |
| 0x8000.0540 | PALMSW | 0 | RW | 32 | Least significant 32-bit word of LCD palette register |

TABLE 1-continued

| Address | Name | Default | RD/WR | Size | Comments |
|---|---|---|---|---|---|
| 0x8000.0580 | PALMSW | 0 | RW | 32 | Most significant 32-bit word of LCD palette register |
| 0x8000.05C0 | STFCLR | — | WR | — | Write to clear all start up reason flags |
| 0x8000.0600 | BLEOI | — | WR | — | Write to clear battery low interrupt |
| 0x8000.0640 | MCEOI | — | WR | — | Write to clear media changed interrupt |
| 0x8000.0680 | TEOI | — | WR | — | Write to clear tick |
| 0x8000.06C0 | TC1EOI | — | WR | — | Write to clear TC1 interrupt |
| 0x8000.0700 | TC2EOI | — | WR | — | Write to clear TC2 interrupt |
| 0x8000.0740 | RTCEOI | — | WR | — | Write to clear RTC match interrupt |
| 0x8000.0780 | UMSEOI | — | WR | — | Write to clear UART modem status changed interrupt |
| 0x8000.07C0 | COEOI | — | WR | — | Write to clear CODEC sound interrupt |
| 0x8000.0800 | HALT | — | WR | — | Write to enter the Idle State |
| 0x8000.0840 | STDBY | — | WR | — | Write will have no effect, read is undefined |
| 0x8000.0880 | Reserved | | | | |
| 0x8000.0FFF | | | | | |
| 0x8000.1000 | FBADDR | C | RW | 4 | LCD frame buffer start address |
| 0x8000.1100 | SYSCON2 | 0 | RW | 16 | System control register 2 |
| 0x8000.1140 | SYSFLG2 | 0 | RD | 16 | System status register 2 |
| 0x8000.1240 | INSTR2 | 0 | RD | 24 | Interrupt status register 2 |
| 0x8000.1280 | INTMR2 | 0 | RW | 16 | Interrupt mask register 2 |
| 0x8000.12C0– | Reserved | | | | Write will have no effect, read is undefined |
| 0x80000.147F | | | | | |
| 0x8000.1480 | UARTDR2 | 0 | RW | 8W/11R | UART2 Data Register |
| 0x8000.14C0 | UBLCR2 | 0 | RW | 32 | UART2 bit rate and line control register |
| 0x8000.1500 | SS2DR | 0 | RW | 16 | Master/slave SSI2 data Register |
| 0x8000.1600 | SRXEOF | — | WR | — | Write to clear RX FIFO overflow flag |

TABLE 1-continued

| Address | Name | Default | RD/WR | Size | Comments |
|---|---|---|---|---|---|
| 0x8000.16C0 | SS2POP | — | WR | — | Write to pop SSI2 residual byte into RX FIFO |
| 0x8000.1700 | KBDEOI | — | WR | — | Write to clear keyboard interrupt |
| 0x8000.1800 | Reserved | — | WR | — | Do not write to this location. A write will cause the processor to go into an unsupported power savings state. |
| 0x8000.1840–0x8000.1FFF | Reserved | — | | | Write will have no effect, read is undefined |

TABLE 2A

| Interrupt | Bit in INTMR1 and INTSR1 | Name | Comment |
|---|---|---|---|
| FIQ | 0 | EXTFIQ | External fast interrupt input (NEXTFIQ pin) |
| FIQ | 1 | BLINT | Battery low interrupt |
| FIQ | 2 | WEINT | Watchdog expired interrupt |
| FIQ | 3 | MCINT | Media changed interrupt |
| IRQ | 4 | CSINT | Codec sound interrupt |
| IRQ | 5 | EINT1 | External interrupt input 1 (NEINT1 pin) |
| IRQ | 6 | EINT2 | External interrupt input 2 (NEINT2 pin) |
| IRQ | 7 | EINT3 | External interrupt input 3 (EINT3 pin) |
| IRQ | 8 | TC1OI | TC1 underflow interrupt |
| IRQ | 9 | TC2OI | TC2 underflow interrupt |
| IRQ | 10 | RTCMI | RTC compare match interrupt |
| IRQ | 11 | TINT | 64 Hz tick interrupt |
| IRQ | 12 | UTXINT1 | Internal UART 1 transmit FIFO empty interrupt |
| IRQ | 13 | URXINT1 | Internal UART1 receive FIFO full interrupt |
| IRQ | 14 | UMSINT | Internal UART1 modem status changed interrupt |
| IRQ | 15 | SSEOTI | Synchronous serial interface 1 end of transfer interrupt |

TABLE 2B

| Interrupt | Bit in INTMR2 and INTSR2 | Name | Comment |
|---|---|---|---|
| IRQ | 0 | KBDINT | Key press interrupt |
| IRQ | 1 | SS2RX | Master/slave SSI 16 bytes received |
| IRQ | 2 | SS2TX | Master/slave SSI 16 bytes transmitted |
| IRQ | 12 | UTXINT2 | UART2 transmit FIFO empty interrupt |
| IRQ | 13 | URXINT2 | UART2 receive FIFO full interrupt |

TABLE 2C

| Interrupt | Bit in INTMR3 and INTSR3 | Name | Comment |
|---|---|---|---|
| FIQ | 0 | MCPINT | MCP interface interrupt |

TABLE 3

| Interrupt Pin | Input State | Operating State Latency | Idle State Latency | Standby State Latency |
|---|---|---|---|---|
| NEXTFIQ | Not deglitched; must be active for 20 μs to be detected | Worst case latency of 20 μs | Worst case 20 μs; if only single cycle instructions, less that 1 μs | Including PLL/ocs. setting time, approx. 0.25 s when FASTWAKE = 0, or approx. 500 μs when FASTWAKE = 1, or = Idle State if in 13 MHz mode with CLENSL set |
| NEINT1–2 | not deglitched | Worst case latency of 20 μs | As above | As above |
| EINT3 | Not deglitched | Worst case latency of 20 μs | As above | As above |
| MEDCHG | Deglitched by 16 kHz clock; must be active for at least 80 μs to be detected | Worst case latenncy of 80 μs | Worst case 80 μs; if only single cycle instructions 61 μs | As above (note difference if in 13 MHz mode with CLKENSL set) |

TABLE 4

| PE[1] | PE[0] | Boot Block (NCS0) |
|---|---|---|
| 0 | 0 | 32-bit |
| 0 | 1 | 8-bit |
| 1 | 0 | 16-bit |
| 1 | 1 | Undefined |

TABLE 5A

| Address Range | Chip Select |
| --- | --- |
| 0000.0000–0FFF.FFFF | CS7 (Internal only) |
| 1000.0000–1FFF.FFFF | CS6 (Internal only) |
| 2000.0000–2FFF.FFFF | NCS5 |
| 3000.0000–3FFF.FFFF | NCS4 |
| 4000.0000–4FFF.FFFF | NCS3 |
| 5000.0000–5FFF.FFFF | NCS2 |
| 6000.0000–6FFF.FFFF | NCS1 |
| 7000.0000–7FFF.FFFF | NCS0 |

TABLE 5B

| Address Range | Chip Select |
| --- | --- |
| 0000.0000–0FFF.FFFF | NCS0 |
| 1000.0000–1FFF.FFFF | NCS1 |
| 2000.0000–2FFF.FFFF | NCS2 |
| 3000.0000–3FFF.FFFF | NCS3 |
| 4000.0000–4FFF.FFFF | NCS4 |
| 5000.0000–5FFF.FFFF | NCS5 |
| 6000.0000–6FFF.FFFF | CS6 (Internal only) |
| 7000.0000–7FFF.FFFF | CS7 (Internal only) |

TABLE 6

| DRAM Address Pins | DRAM Column × 16 Mode | DRAM Column × 32 Mode | DRAM Row × 16§ Mode | DRAM Row × 32 Mode | Pin Name |
| --- | --- | --- | --- | --- | --- |
| 0 | A1* | A2 | A9 | A10 | A[27]/DRA[0] |
| 1 | A2 | A3 | A10 | A11 | A[26]/DRA[1] |
| 2 | A3 | A4 | A11 | A12 | A[25]/DRA[2] |
| 3 | A4 | A5 | A12 | A13 | A[24]/DRA[3] |
| 4 | A5 | A6 | A13 | A14 | A[23]/DRA[4] |
| 5 | A6 | A7 | A14 | A15 | A[22]/DRA[5] |
| 6 | A7 | A8 | A15 | A16 | A[21]/DRA[6] |
| 7 | A8 | A9 | A16 | A17 | A[20]/DRA[7] |
| 8 | A18 | A19 | A17 | A18 | A[19]/DRA[8] |
| 9 | A20 | A21 | A19 | A20 | A[18]/DRA[9] |
| 10 | A22 | A23 | A21 | A22 | A[17]/DRA[10] |
| 11 | A24 | A25 | A23 | A24 | A[16]/DRA[11] |
| 12 | A26 | A27 | A25 | A26 | A[15]/DRA[12] |

TABLE 7

| Size | Address Configuration | Total Size of Bank | Address Range of Segments | Size of Segments |
| --- | --- | --- | --- | --- |
| 4 Mbit | 9 Row × 9 Column | 1 Mbyte | n000.0000–n00F.FFFF | 1 Mbyte |
| 16 Mbit | 10 Row × 10 Column | 4 Mbytes | n000.0000–n03F.FFFF | 4 Mbytes |
| 16 Mbit | 12 Row × 8 Column | 4 Mbytes | n000.0000–n007.FFFF | 512 KBYTES |
| | | | n010.0000–n017.FFFF | 512 KBYTES |
| | | | n040.0000–n047.FFFF | 512 KBYTES |
| | | | n050.0000–n057.FFFF | 512 KBYTES |
| | | | n100.0000–n107.FFFF | 512 KBYTES |
| | | | n110.0000–n117.FFFF | 512 KBYTES |
| | | | n140.0000–n147.FFFF | 512 KBYTES |
| | | | n150.0000–n157.FFFF | 512 KBYTES |
| 64 Mbit | 11 Row × 11 Column | 16 Mbytes | n000.0000–n0FF.FFFF | 16 Mbytes |
| 64 Mbit | 13 Row × 9 Column | 16 Mbytes | n000.0000–n01F.FFFF | 2 Mbytes |
| | | | n040.0000–n05F.FFFF | 2 Mbytes |
| | | | n100.0000–n11F.FFFF | 2 Mbytes |
| | | | n140.0000–n15F.FFFF | 2 Mbytes |
| | | | n400.0000–n41F.FFFF | 2 Mbytes |
| | | | n440.0000–n45F.FFFF | 2 Mbytes |
| | | | n500.0000–n51F.FFFF | 2 Mbytes |
| | | | n540.0000–n55F.FFFF | 2 Mbytes |
| 256 Mbit | 12 Row × 12 Column | 64 Mbytes | n000.0000–n3FF.FFFF | 64 Mbytes |
| 1 Gbit | 13 Row × 13 Column | 256 Mbytes | n000.0000–nFFF.FFFF | 256 MBytes |

TABLE 8

| Size | Address Configuration | Total Size of Bank | Address Range of Segments(s) | Size of Segment(s) |
| --- | --- | --- | --- | --- |
| 4 Mbit | 9 Row × 9 Column | 0.5 Mbyte | n000.0000–n007.FFFF | 0.5 MByte |
| 16 Mbit | 10 Row × 10 Column | 2 Mbytes | n000.0000–n01F.FFFF | 2 Mbytes |
| 16 Mbit | 12 Row × 8 Column | 2 Mbytes | n000.0000–n003.FFFF | 256 KBytes |
| | | | n008.0000–n00B.FFFF | 256 KBytes |
| | | | n020.0000–n023.FFFF | 256 KBytes |
| | | | n028.0000–n02B.FFFF | 256 KBytes |
| | | | n080.0000–n083.FFFF | 256 KBytes |
| | | | n088.0000–n08B.FFFF | 256 KBytes |
| | | | n0A0.0000–n0A3.FFFF | 256 KBytes |
| | | | n0A8.0000–n0AB.FFFF | 256 KBytes |
| 64 Mbit | 11 Row × 11 Column | 8 Mbytes | n000.000–n07F.FFFF | 8 Mbytes |
| 64 Mbit | 13 Row × 9 Column | 8 Mbytes | n000.0000–n00F.FFFF | 1 MByte |

TABLE 8-continued

| Size | Address Configuration | Total Size of Bank | Address Range of Segments(s) | Size of Segment(s) |
|---|---|---|---|---|
| | | | n020.0000–n02F.FFFF | 1 MByte |
| | | | n080.0000–n08F.FFFF | 1 MByte |
| | | | n0A0.0000–n0AF.FFFF | 1 MByte |
| | | | n200.0000–n20F.FFFF | 1 MByte |
| | | | n220.0000–n22F.FFFF | 1 MByte |
| | | | n280.0000–n28F.FFFF | 1 MByte |
| | | | n2A0.0000–n2AF.FFFF | 1 MByte |
| 256 Mbit | 12 Row × 12 Column | 32 Mbytes | n000.0000–n1FF.FFFF | 32 Mbytes |
| 1 Gbit | 13 Row × 13 Column | 128 Mbytes | n000.0000–n7FF.FFFF | 128 Mbytes |

TABLE 9

| Address (W/B) | Operating | Idle | Standby | NPOR RESET | NRESET RESET |
|---|---|---|---|---|---|
| DRAM Control | On | On | SELFREF | Off | SELFREF |
| UARTs | On | On | Off | Reset | Reset |
| LCD FIFO | On | On | Reset | Reset | Reset |
| LCD | On | On | Off | Reset | Reset |
| ADC Interface | On | On | Off | Reset | Reset |
| SSI2 Interface | On | On | Off | Reset | Reset |
| DAI Interface | On | On | Off | Reset | Reset |
| Codec | On | On | Off | Reset | Reset |
| Timers | On | On | Off | Reset | Reset |
| RTC | On | On | On | On | On |
| LED Flasher | On | On | On | Reset | Reset |
| DC-to-DC | On | On | Off | Reset | Reset |
| CPU | On | Off | Off | Reset | Reset |
| Interrupt Control | On | On | On | Reset | Reset |
| PLL/CLKEN Signal | On | On | Off | Off | Off |

TABLE 11

| Type | Comments | Referred To As | Max. Transfer Speed |
|---|---|---|---|
| SP/Microwire 1 | Master mode only | ADC Interface | 128 Kbps |
| SPI/Microwire 2 | Master/slave mode | SSI2 Interface | 512 Kbps |
| MCP Interface | CD quality DACs and ADCs | DAI | 1.536 Mbps |
| Codec Interface | Only for use in the PLL clock mode | Codec Interface | 64 Kpbs |

TABLE 12

| SYSCON1 Bit 17 | SYSCON1 Bit 16 | 13.0 MHz Operation ADCCLK Frequency (kHz) | 18.432–73.728 MHz Operation ADCCLK Frequency (kHz) |
|---|---|---|---|
| 0 | 0 | 4.2 | 4 |
| 0 | 1 | 16.9 | 16 |

TABLE 10

| Pin No. LQFP | External Pin Name | SSI2 Slave Mode (Internal Name) | SSI2 Master Mode | Codec Internal Name | DAI | Strength |
|---|---|---|---|---|---|---|
| 63 | SSICCLK | SSICCLK = serial bit clock; Input | Output | PCMCLK = Output | SCLK = Output | 1 |
| 65 | SSITXFR | SSKTXFR = TX frame sync; Input | Output | PCMSYNC = Output | LRCK = Output | 1 |
| 66 | SSITXDA | SSITXDA = TX data; Output | Output | PCMOUT = Output | SDOUT = Output | 1 |
| 67 | SSIRXDA | SSIRXDA = RX data; Input | Input | PCMIN = Input | SDIN = Input | 1 |
| 68 | SSIRXFR | SSIRXFR = RX frame sync; Input | Output | p/u* | MCLK | 1 |

*p/u = use an 10 k pull-up

TABLE 12-continued

| SYSCON1 Bit 17 | SYSCON1 Bit 16 | 13.0 MHz Operation ADCCLK Frequency (kHz) | 18.432–73.728 MHz Operation ADCCLK Frequency (kHz) |
|---|---|---|---|
| 1 | 0 | 67.7 | 64 |
| 1 | 1 | 135.4 | 128 |

TABLE 13

| | | Byte Lanes to Memory/Ports/Registers | | | | | | | RO Contents | |
| | | Big Endian Memory | | | | Little Endian Memory | | | | |
| Address (W/B) | Data In Memory | 7:0 | 15:8 | 23:16 | 31:24 | 7:0 | 15:8 | 23:16 | 31:24 | Big Endian | Little Endian |
|---|---|---|---|---|---|---|---|---|---|---|---|
| Word +0 (W) | 11223344 | 44 | 33 | 22 | 11 | 44 | 33 | 22 | 11 | 11223344 | 11223344 |
| Word +1 (W) | 11223344 | 44 | 33 | 22 | 11 | 44 | 33 | 22 | 11 | 44112233 | 44112233 |
| Word +2 (W) | 11223344 | 44 | 33 | 22 | 11 | 44 | 33 | 22 | 11 | 33441122 | 33441122 |
| Word +3 (W) | 11223344 | 44 | 33 | 22 | 11 | 44 | 33 | 22 | 11 | 22334411 | 22334411 |
| Word +0 (B) | 11223344 | dc | dc | dc | 11 | 44 | dc | dc | dc | 00000011 | 00000044 |
| Word +1 (B) | 11223344 | dc | dc | 22 | dc | dc | 33 | dc | dc | 00000022 | 00000033 |
| Word +2 (B) | 11223344 | dc | 33 | dc | dc | dc | dc | 22 | dc | 00000033 | 00000022 |
| Word +3 (B) | 11223344 | 44 | dc | dc | dc | dc | dc | dc | 11 | 00000044 | 00000011 |

TABLE 14

| | | Byte Lanes to Memory/Ports/Registers | | | | | | | |
| | | Big Endian Memory | | | | Little Endian Memory | | | |
| Address (W/B) | Register Contents | 7:0 | 15:8 | 23:16 | 31:24 | 7:0 | 15:8 | 23:16 | 31:24 |
|---|---|---|---|---|---|---|---|---|---|
| Word +0 (W) | 11223344 | 44 | 33 | 22 | 11 | 44 | 33 | 22 | 11 |
| Word +1 (W) | 11223344 | 44 | 33 | 22 | 11 | 44 | 33 | 22 | 11 |
| Word +2 (W) | 11223344 | 44 | 33 | 22 | 11 | 44 | 33 | 22 | 11 |
| Word +3 (W) | 11223344 | 44 | 33 | 22 | 11 | 44 | 33 | 22 | 11 |
| Word +0 (B) | 1223344 | 44 | 44 | 44 | 44 | 44 | 44 | 44 | 44 |
| Word +1 (B) | 11223344 | 44 | 44 | 44 | 44 | 44 | 44 | 44 | 44 |
| Word +2 (B) | 11223344 | 44 | 44 | 44 | 44 | 44 | 44 | 44 | 44 |
| Word +3 (B) | 11223344 | 44 | 44 | 44 | 44 | 44 | 44 | 44 | 44 |

TABLE 15

| Name | Bits | Address | Comment |
|---|---|---|---|
| UNIQID | 31:0 | 0x2440 | 32 bit ID |
| UNIQCHK | 39:32 | 0x2450 | 8 bit hamming code for UNIQ |
| UNIQID2 | 159:128 | 0x2700 | 32 bit ID #2 |
| UNIQID3 | 191:160 | 0x2704 | 32 bit ID #3 |
| UNIQID4 | 223:192 | 0x2708 | 32 bit ID #4 |
| UNIQID5 | 255:224 | 0x270C | Hamming codes and flags |
| UNIQCHK2 | 231:224 | | 8 bit hamming code for UNIQID2 |
| UNIQCHK3 | 239:232 | | 8 bit hamming code for UNIQID3 |
| UNIQCHK4 | 247:240 | | 8 bit hamming code for UNIQID4 |
| ASECEX | 248 | | Alternate security exists |
| | 255:249 | | Reserved '0' |

TABLE 16

| Name | Comment |
| --- | --- |
| PRIVID | PRIVATE ID number |
| PRIVHAM | PRIVATE hamming code for private ID numbers |
| PRIVFLG | Private firmware exists |

TABLE 17

| Bit | Definition |
| --- | --- |
| 0 | Good Validation |
| 1 | ID all 0's |
| 2 | CHK all 0's |
| 3 | ID all 1's |
| 4 | CHK all 1's |

TABLE 18

| Name | Address | ID-CHK pair |
| --- | --- | --- |
| UNIQVAL | 0x2460 | UNIQID-UNIQCHK |
| UNIQVAL2 | 0x2720 | UNIQID2-UNIQCHK2 |
| UNIQVAL3 | 0x2724 | UNIQID3-UNIQCHK3 |
| UNIQVAL4 | 0x2728 | UNIQID4-UNIQCHK4 |

TABLE 19

| Name | Address | ID-CHK pair |
| --- | --- | --- |
| SECVAL1 | 0x2540 | SECID1-SECCHK1 |
| SECVAL2 | 0x2544 | SECID2-SECCHK2 |

TABLE 20

| Name | Address | Comment |
| --- | --- | --- |
| TESTID | 0x27AC | 32 bit general register |
| TESTCHK | 0x2753 | 8 bit general register |
| TESTVAL | 0x2744 | Validation for TESTID-TESTCHK pair |

What is claimed is:

1. A method of preventing access and observation of encached information comprising the steps of:
   generating private information to be encached;
   storing the private information in memory;
   updating a translation look aside buffer with descriptors to locations in memory containing the private information;
   forcing a cache miss to a selected location in cache to be loaded with a selected portion of the private information;
   retrieving the selected portion of the private information from memory using a corresponding descriptor from the translation look aside buffer;
   loading the retrieved portion of the private information into the selected location in cache; and
   locking the selected portion of the private information in the selected location in cache.

2. The method of claim 1 and further comprising the step of locking the descriptor corresponding to the selected portion of the private information in the translation look aside buffer.

3. The method of claim 1 wherein said selected location in cache is associated with a replacement counter base and said step of locking comprises the substep of resetting the replacement counter base to a value higher than the replacement counter base associated with the selected location in cache.

4. The method of claim 1 wherein said step of updating the translation look aside buffer comprises the substeps of:
   setting up a translation table including entries for generating the descriptors to memory locations storing the private information;
   updating a replacement counter to point to a current translation look aside buffer entry to be filled;
   forcing a miss to the current translation look aside buffer entry;
   performing a table walk through the translation table to generate a descriptor associated with private information in memory; and
   loading the descriptor obtained from the table walk in the current translation look aside buffer entry.

5. The method of claim 1 wherein said step of loading the retrieved portion of the private information into the selected location in cache comprises the step of loading a cache line in instruction cache.

6. The method of claim 1 wherein said step of loading the selected portion of the private information in cache comprises the step of loading a cache line in data cache.

7. The method of claim 1 wherein said step of updating the translation look aside buffer comprises a step of setting up a translation table comprises the step of setting up an emulated translation table.

8. A processing system comprising:
   a memory for storing private information to be secured;
   cache memory having a target location for encacheing said private information;
   a translation look aside buffer having a location for storing a descriptor for accessing said private information from said memory; and
   control circuitry operable to:
      force a miss to the target location in said cache;
      retrieve the private information from said memory using said descriptor in said translation look aside buffer;
      load the retrieved private information into the target location in said cache; and
      lock said private information in the target location in said cache.

9. The processing system of claim 8 wherein said control circuitry is further operable to lock said descriptor in said translation look aside buffer.

10. The processing system of claim 8 wherein said control circuitry comprises a counter pointing to the target location and is operable to lock said private information into the target location in said cache by resetting a base value loaded in said counter.

11. The processing system of claim 8 wherein said control circuitry and said translation look aside buffer comprise a portion of a microprocessor.

12. The processing system of claim 11 wherein said cache comprises a portion of a microprocessor.

13. The processing system of claim 12 wherein said microprocessor comprises a portion of a system-on-a-chip.

14. The processing system of claim 8 wherein said cache comprises an instruction cache.

15. The processing system of claim 8 wherein said cache comprises a data cache.

\* \* \* \* \*